United States Patent
Lee et al.

(10) Patent No.: US 11,849,435 B2
(45) Date of Patent: Dec. 19, 2023

(54) COMMUNICATION METHOD AND DEVICE CONSIDERING FLEXIBLE SLOT FORMAT IN NR V2X

(71) Applicant: LG Electronics Inc., Seoul (KR)

(72) Inventors: Seungmin Lee, Seoul (KR); Hyukjin Chae, Seoul (KR); Kyuhwan Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 17/260,133

(22) PCT Filed: Aug. 9, 2019

(86) PCT No.: PCT/KR2019/010067
§ 371 (c)(1),
(2) Date: Jan. 13, 2021

(87) PCT Pub. No.: WO2020/032679
PCT Pub. Date: Feb. 13, 2020

(65) Prior Publication Data
US 2021/0289496 A1    Sep. 16, 2021

Related U.S. Application Data

(60) Provisional application No. 62/716,950, filed on Aug. 9, 2018.

(51) Int. Cl.
*H04W 74/08*     (2009.01)
*H04W 72/0446*   (2023.01)
(Continued)

(52) U.S. Cl.
CPC ......... *H04W 72/0446* (2013.01); *H04W 4/40* (2018.02); *H04W 28/26* (2013.01); *H04W 74/0808* (2013.01)

(58) Field of Classification Search
CPC ... H04W 72/0446; H04W 4/40; H04W 28/26; H04W 74/0808; H04W 72/02;
(Continued)

(56) References Cited

U.S. PATENT DOCUMENTS

2019/0059091 A1 *   2/2019  Tang ................. H04W 4/40
2019/0313405 A1 *  10/2019  Li .................... H04W 72/542
(Continued)

FOREIGN PATENT DOCUMENTS

WO   WO2017116108        7/2017
WO   WO-2017116108 A1 *  7/2017   ........ H04W 28/0284

OTHER PUBLICATIONS

A. Nabil, K. Kaur, C. Dietrich and V. Marojevic, "Performance Analysis of Sensing-Based Semi-Persistent Scheduling in C-V2X Networks," 2018 IEEE 88th Vehicular Technology Conference (VTC-Fall), 2018, pp. 1-5, doi: 10.1109/VTCFall.2018.8690600. (Year: 2018).*

(Continued)

*Primary Examiner* — Thinh D Tran
(74) *Attorney, Agent, or Firm* — Fish & Richardson P.C.

(57) ABSTRACT

Provided is a method for a first device (100) to perform sidelink transmission. The method may comprise: a step for performing sensing on a plurality of resources on the basis of a first resource unit including one or more symbols; a step for selecting a first transmission resource from the plurality of resources on the basis of the sensing; and a step for performing the sidelink transmission on the first transmission resource.

13 Claims, 33 Drawing Sheets

(51) Int. Cl.
*H04W 4/40* (2018.01)
*H04W 28/26* (2009.01)

(58) Field of Classification Search
CPC ... H04W 92/18; H04B 7/0413; H04B 7/0617; H04L 5/0007
See application file for complete search history.

(56) References Cited

U.S. PATENT DOCUMENTS

| | | | |
|---|---|---|---|
| 2020/0029245 A1* | 1/2020 | Khoryaev | H04W 36/22 |
| 2020/0059896 A1* | 2/2020 | Xu | H04W 28/02 |
| 2020/0260246 A1* | 8/2020 | Tang | H04L 5/0082 |
| 2020/0305152 A1* | 9/2020 | Yasukawa | H04W 92/18 |
| 2022/0007339 A1* | 1/2022 | Li | H04W 72/0446 |

OTHER PUBLICATIONS

Ericsson, "Resource reselection," R1-167009, 3GPP TSG RAN WGl Meeting #86, Goteborg, Sweden, Aug. 22-26, 2016, 9 pages (Year: 2016).*

Ericsson, "Resource reselection," R1-167009, 3GPP TSG RAN WG1 Meeting #86, Göteborg, Sweden, Aug. 22-26, 2016, 9 pages.

Intel Corporation, "On demodulation enhancements for LTE V2V sidelink communication," R1-1802366, 3GPP TSG RAN WG1 Meeting #92, Athens, Greece, Feb. 26-Mar. 2, 2018, 19 pages.

LG Electronics Inc., "Introduction of V2V services based on LTE sidelink," R2-165836, 3GPP TSG-RAN2 Meeting 95, Gothenburg, Sweden, Aug. 22-26, 2016, 24 pages.

Schlienz et al., "Device to Device Communication in LTE," Rohde and Schwarz Whitepaper, dated Sep. 29, 2015, 38 pages.

* cited by examiner

FIG. 12
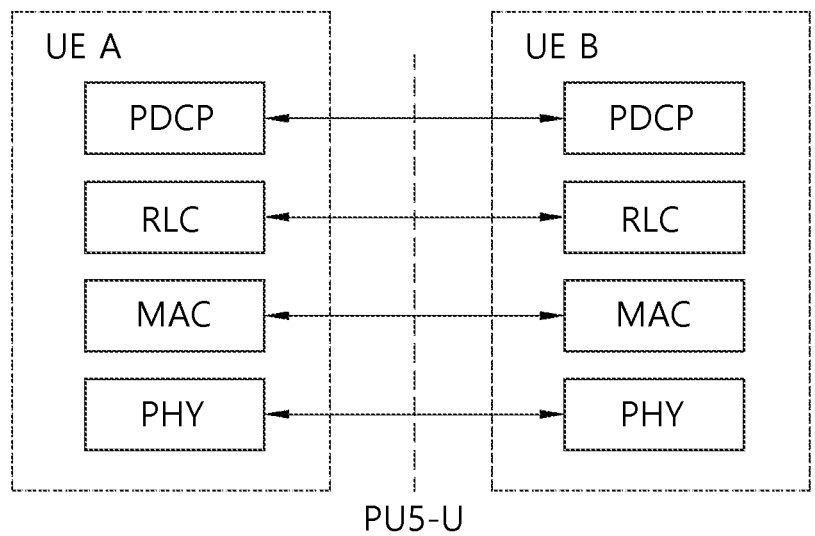
(a)
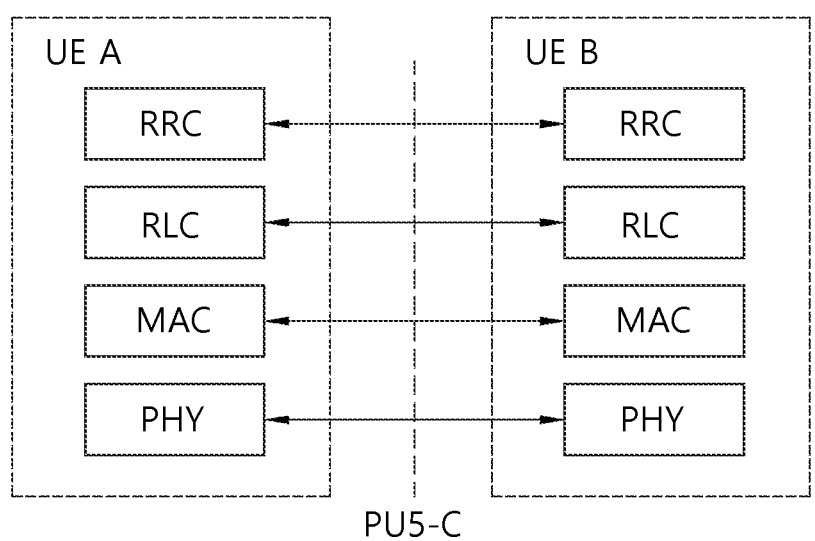
(b)

FIG. 13
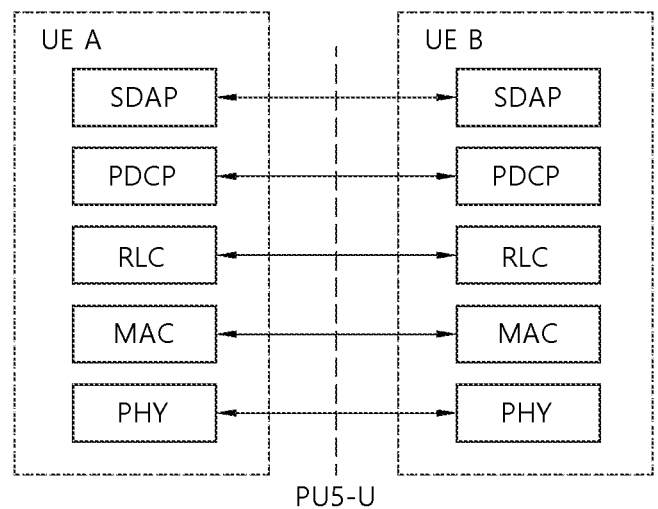
(a)
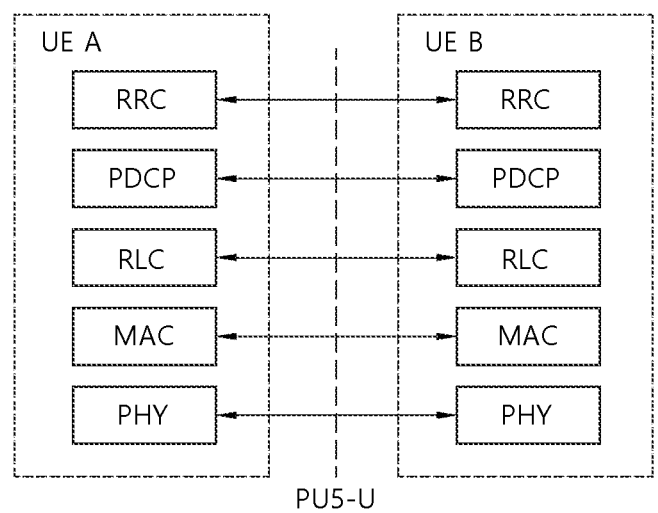
(b)

COMMUNICATION METHOD AND DEVICE CONSIDERING FLEXIBLE SLOT FORMAT IN NR V2X

CROSS-REFERENCE TO RELATED APPLICATIONS

This application is a National Stage application under 35 U.S.C. § 371 of International Application No. PCT/KR2019/010067, filed on Aug. 9, 2019, which claims the benefit of U.S. Provisional Application No. 62/716,950, filed on Aug. 9, 2018. The disclosures of the prior applications are incorporated by reference in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, a wireless communication system needs to estimate an uplink channel or downlink channel for data transmission/reception, system synchronization acquisition, channel information feedback, and so on. In a wireless communication system environment, fading occurs due to multi path time latency. A process of recovering a transmission signal by compensating distortion in a signal, which is caused by an abrupt environment change due to fading, is referred to as channel estimation. Additionally, a channel state for a cell to which the UE belongs or another cell needs to be measured. For channel estimation or channel state measurement, channel estimation is generally performed by using a reference signal (RS), which is mutually known between transceivers.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.
2) Received signal strength indicator (RSSI): RSSI indicates received power measured over the entire band. RSSI includes all of a signal, interference, and thermal noise.
3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Meanwhile, in case of NR sidelink or NR V2X, a flexible slot format is supported. Therefore, there is a need to propose a sidelink communication method considering the flexible slot format and an apparatus supporting the method.

In an embodiment, there is provided a method of performing sidelink transmission by a first device 100. The method may include: performing sensing for a plurality of resources, based on a first resource unit including one or more symbols; selecting a first transmission resource from the plurality of resources, based on the sensing; and performing the sidelink transmission on the first transmission resource.

In another embodiment, there is provided a first device 100 performing sidelink transmission. The first device 100 may include: one or more memories; one or more transceivers; and one or more processors coupling the one or more memories and the one or more transceivers. The processor may be configured to: perform sensing for a plurality of resources, based on a first resource unit including one or more symbols; select a first transmission resource from the plurality of resources, based on the sensing; and control the transceiver to perform the sidelink transmission on the first transmission resource.

A UE can efficiently perform sidelink communication.

BRIEF DESCRIPTION OF THE DRAWINGS

FIG. 12 shows a protocol stack for a sidelink communication to which the exemplary embodiment of the present disclosure can be applied.

FIG. 13 shows a protocol stack for a sidelink communication to which the exemplary embodiment of the present disclosure can be applied.

DESCRIPTION OF EXEMPLARY EMBODIMENTS

In this document, the term "I" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
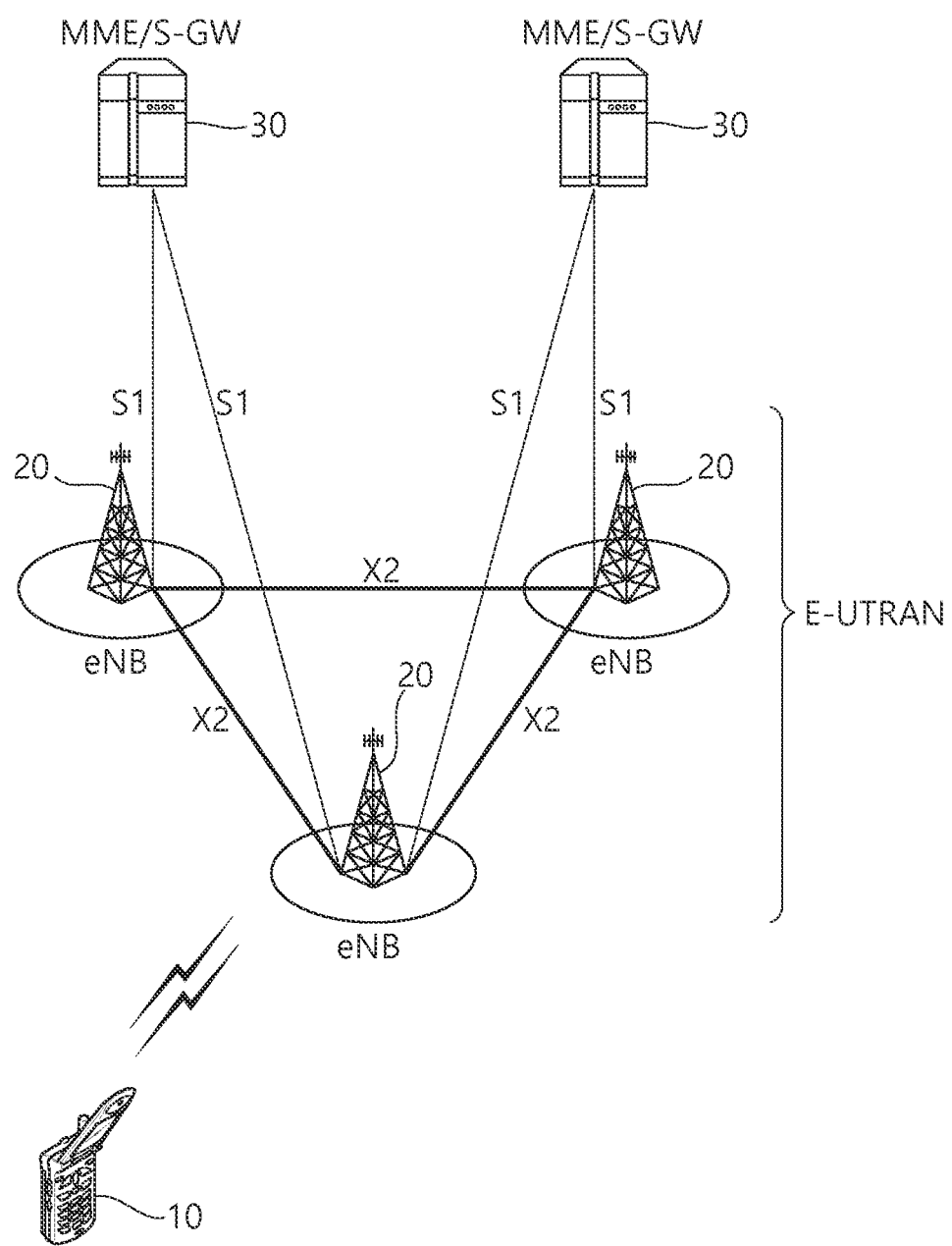
FIG. 1 shows a structure of an LTE system to which an exemplary embodiment of the present disclosure can be applied.

FIG. 1 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
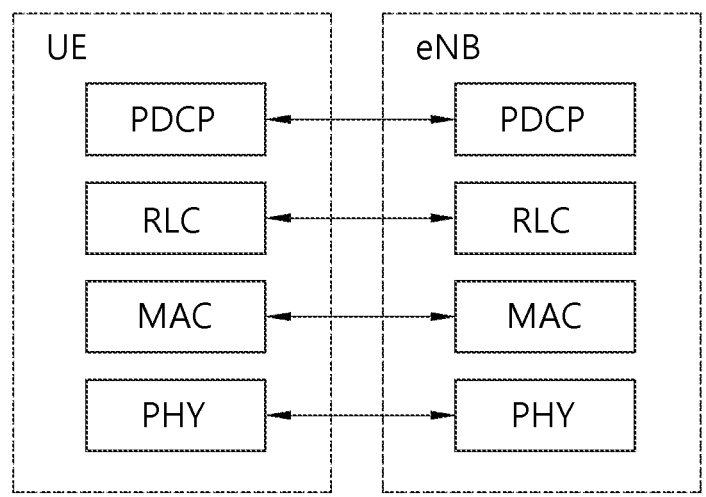
FIG. 2 shows a radio protocol architecture of a user plane to which an exemplary embodiment of the present disclosure can be applied.
Figure 3:
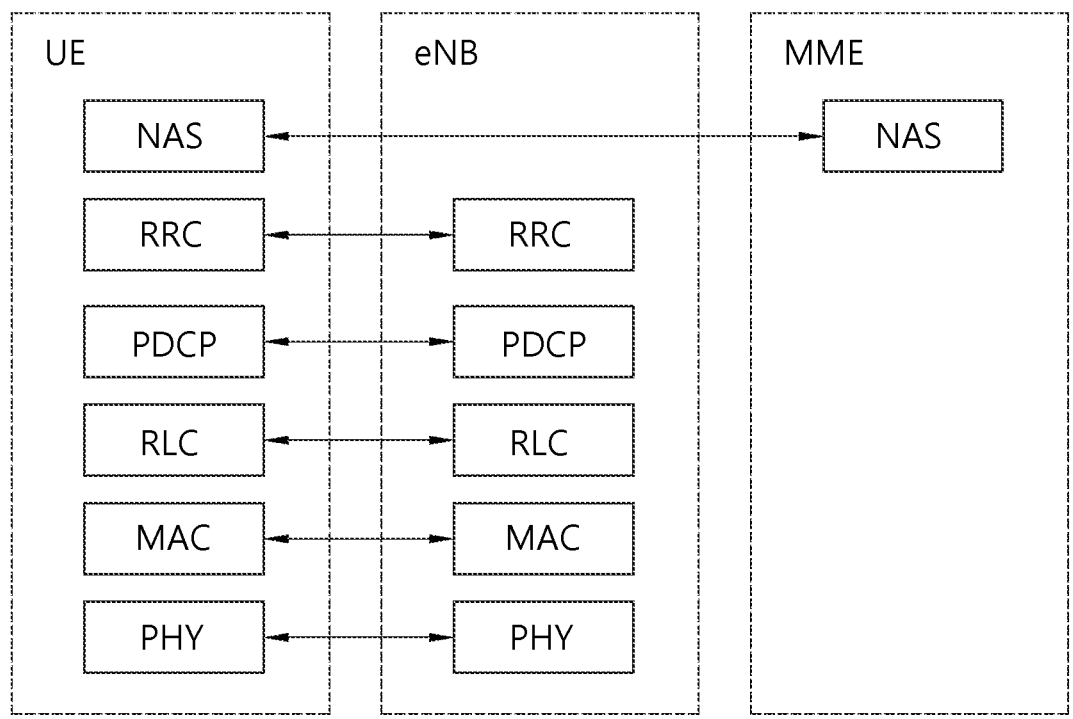
FIG. 3 shows a radio protocol architecture of a control plane to which an exemplary embodiment of the present disclosure can be applied.

FIG. 2 shows a radio protocol architecture of a user plane to which an exemplary embodiment of the present disclosure can be applied. FIG. 3 shows a radio protocol architecture of a control plane to which an exemplary embodiment of the present disclosure can be applied. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
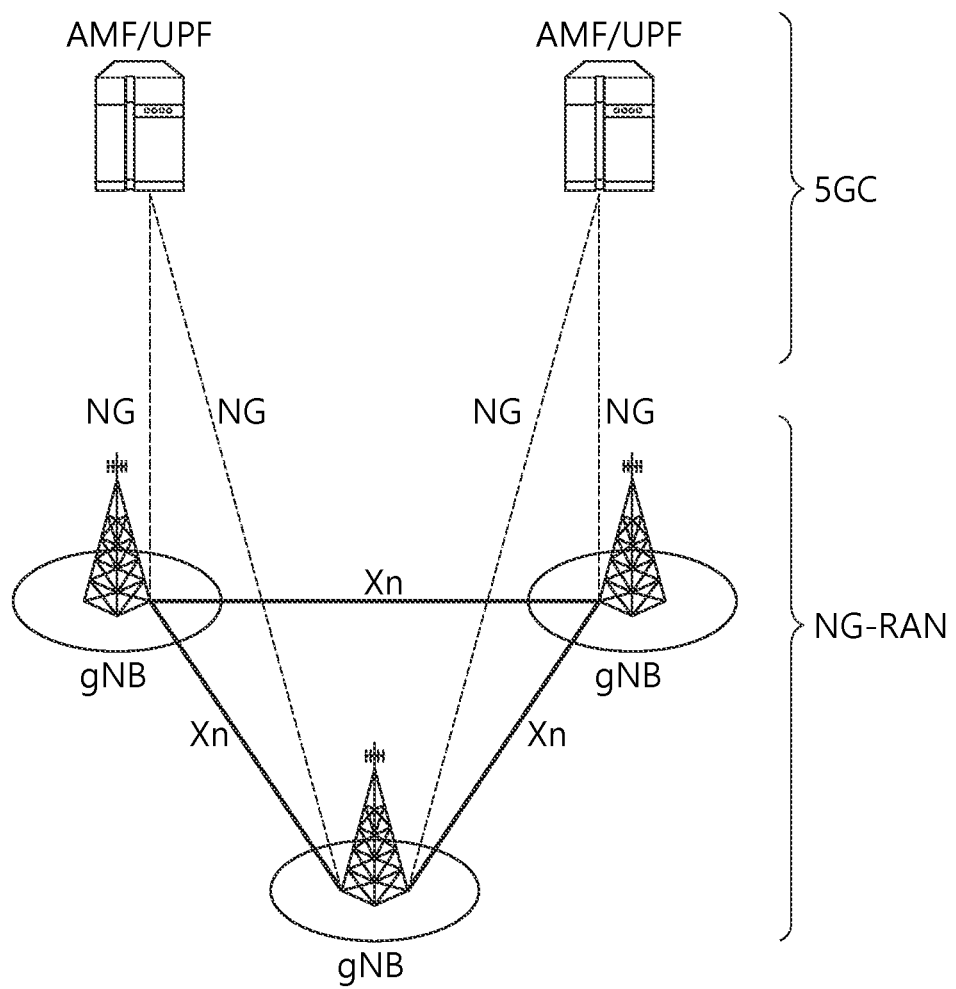
FIG. 4 shows a structure of an NR system to which an exemplary embodiment of the present disclosure can be applied.

FIG. 4 shows a structure of an NR system to which an exemplary embodiment of the present disclosure can be applied.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
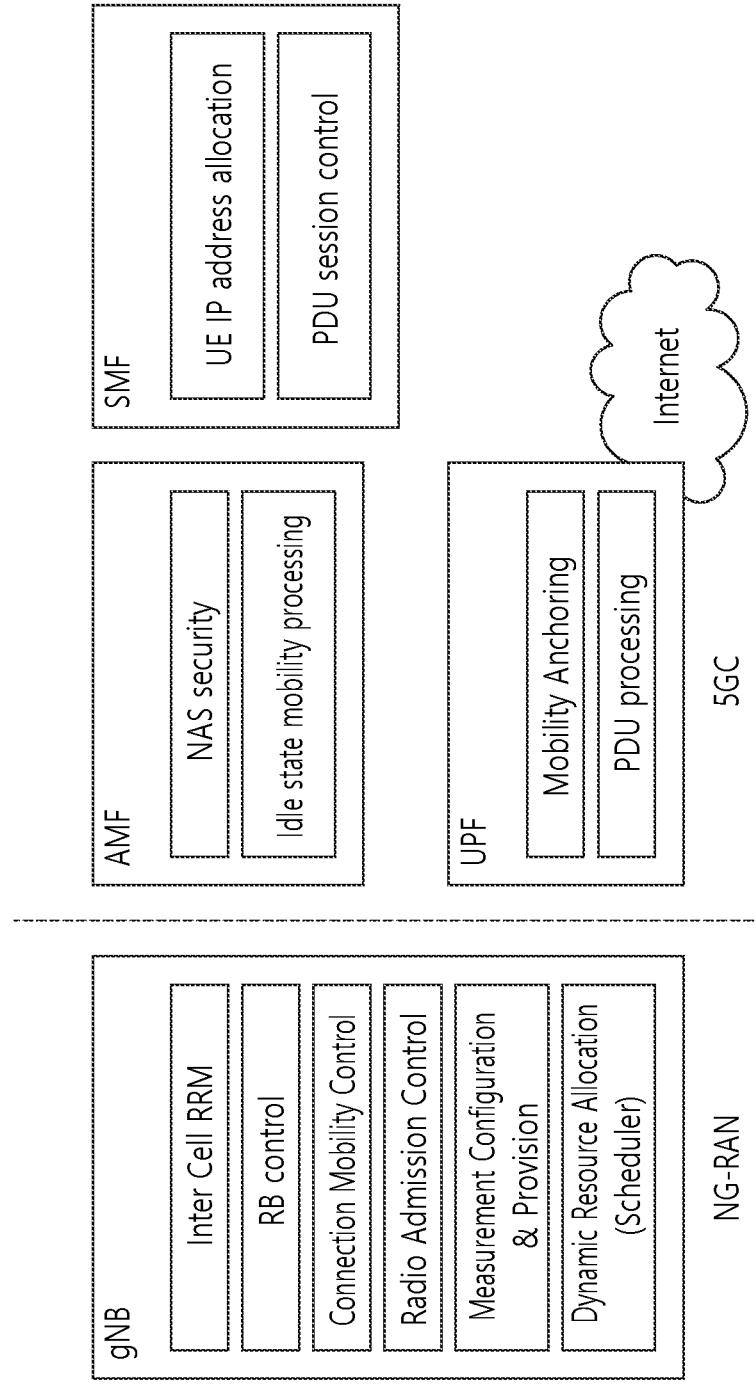
FIG. 5 shows a functional division between an NG-RAN and a 5GC to which an exemplary embodiment of the present disclosure can be applied.

FIG. 5 shows a functional division between an NG-RAN and a 5GC to which an exemplary embodiment of the present disclosure can be applied.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 6:
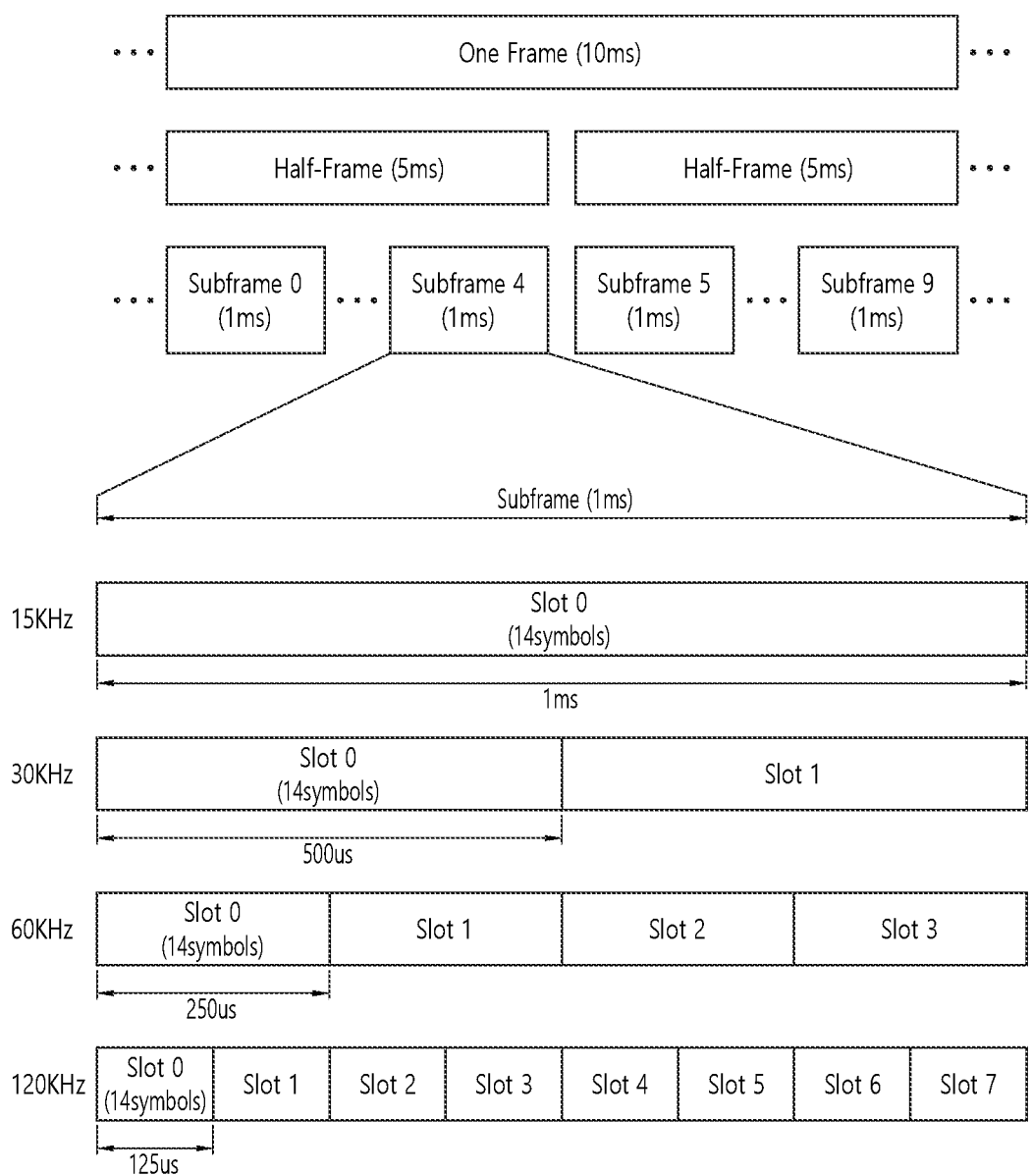
FIG. 6 shows a structure of a radio frame of an NR to which an exemplary embodiment of the present disclosure can be applied.

FIG. 6 shows a structure of a radio frame of an NR to which an exemplary embodiment of the present disclosure can be applied.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
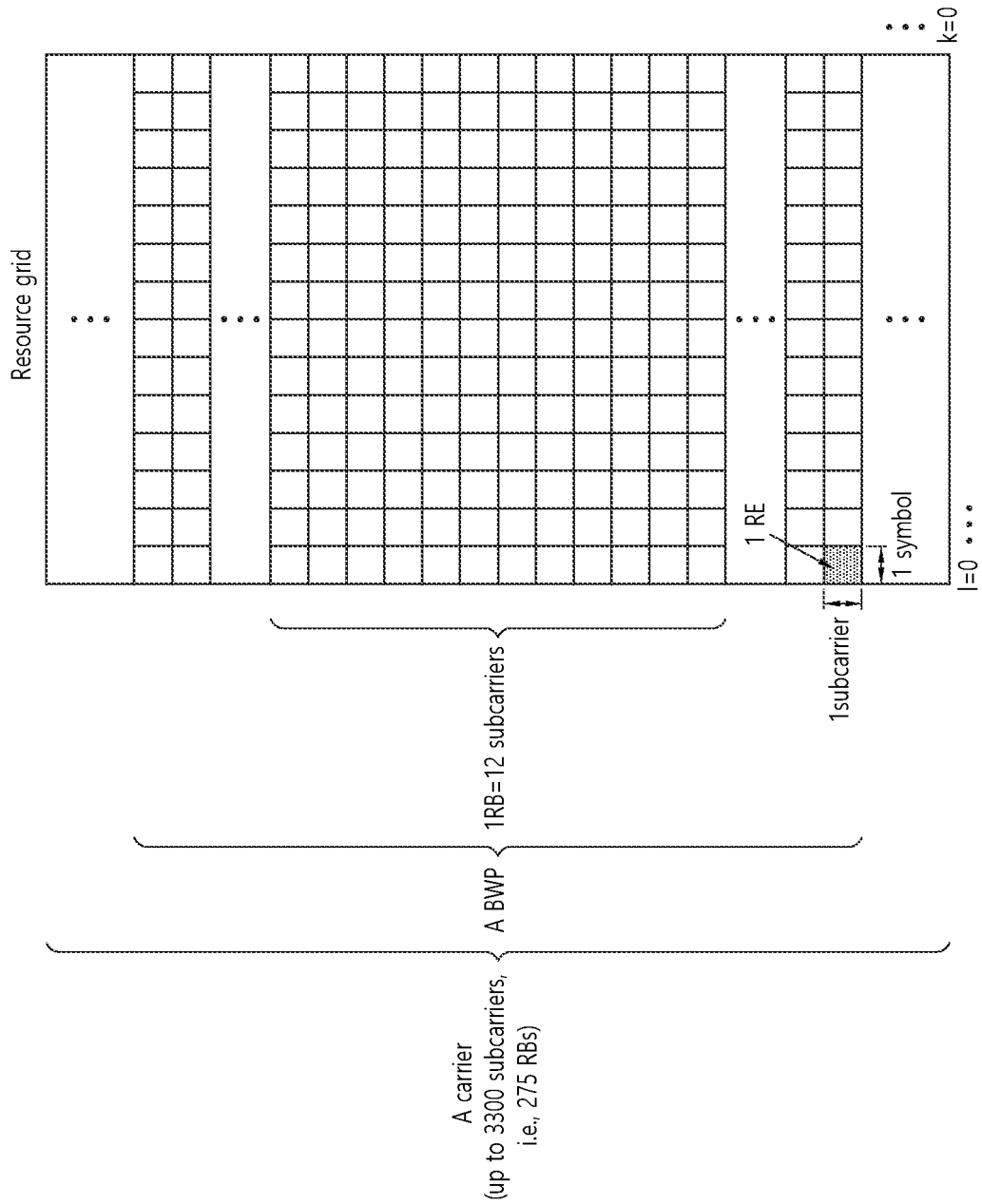
FIG. 7 shows a structure of a slot of an NR frame to which an exemplary embodiment of the present disclosure can be applied.

FIG. 7 shows a structure of a slot of an NR frame to which an exemplary embodiment of the present disclosure can be applied.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a consecutive set of physical resource blocks (PRBs) in a given numerology. The PRB may be selected from a consecutive subset of common resource blocks (CRBs) for a given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive a PDCCH, a PDSCH, or a CSI-RS (however, an RRM is excluded) outside the active DL BWP. For example, the UE may not trigger a CSI report for an inactive DL BWP. For example, the UE may not transmit a PUCCH or a PUSCH outside the active UL BWP. For example, in a downlink case, the initial BWP may be given as a consecutive RB set for an RMSI CORESET (configured by a PBCH). For example, in an uplink case, the initial BWP may be given by an SIB for a random access procedure. For example, the default BWP may be configured by a higher layer. For example, an initial value of the default BWP may be an initial DL BWP. For energy saving, if the UE cannot detect DCI for a specific period of time, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
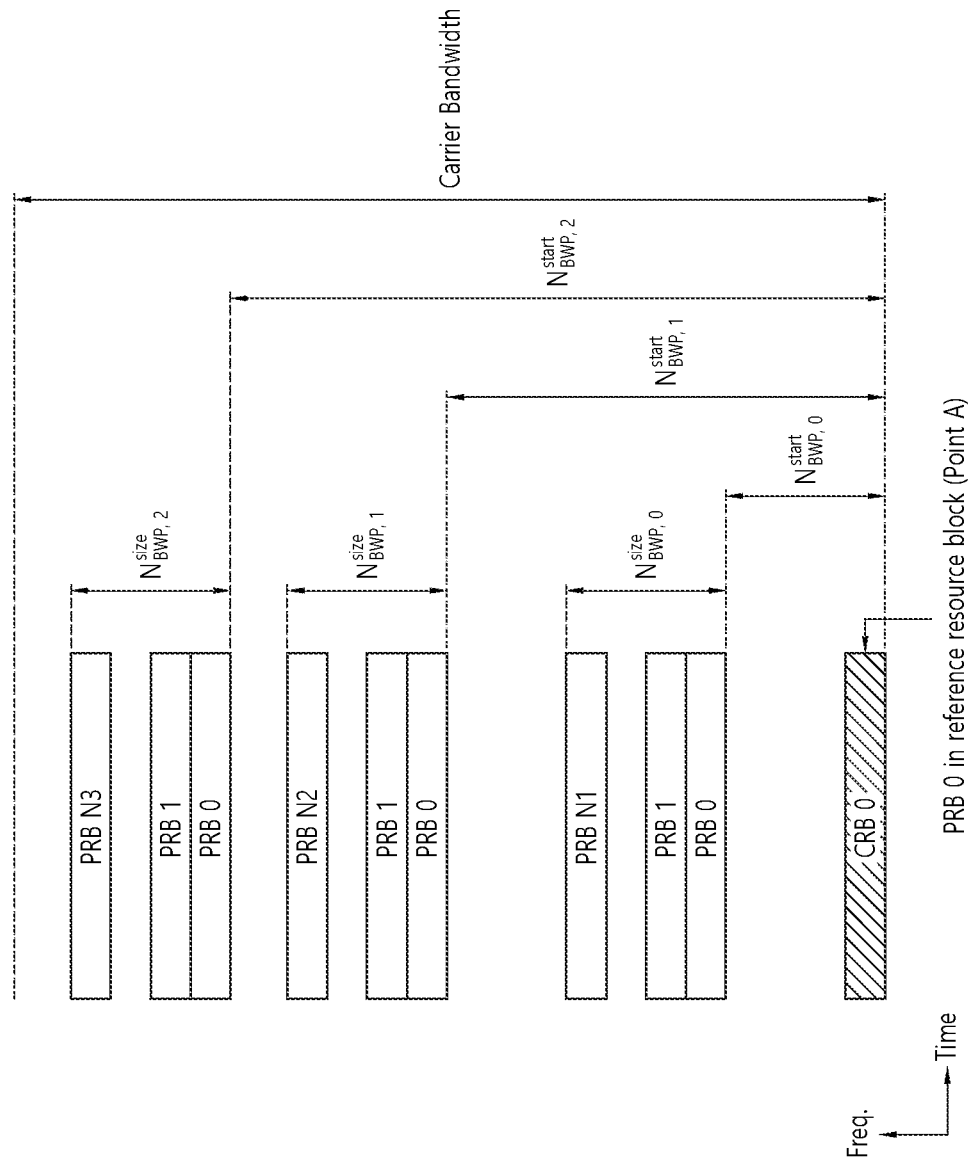
FIG. 8 shows a BWP to which an exemplary embodiment of the present disclosure can be applied.

FIG. 8 shows a BWP to which an exemplary embodiment of the present disclosure can be applied. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest sub carrier and the point A in a given numerology. For example, the bandwidth may be the number of PRBs in the given numerology.

Hereinafter, beamforming will be described.

Beamforming technology using multiple antennas may be broadly divided into analog beamforming technology (hereinafter, "analog beamforming") and digital beamforming technology (hereinafter, "digital beamforming") depending on where a beamforming weight vector or precoding vector is applied.

Figure 9:
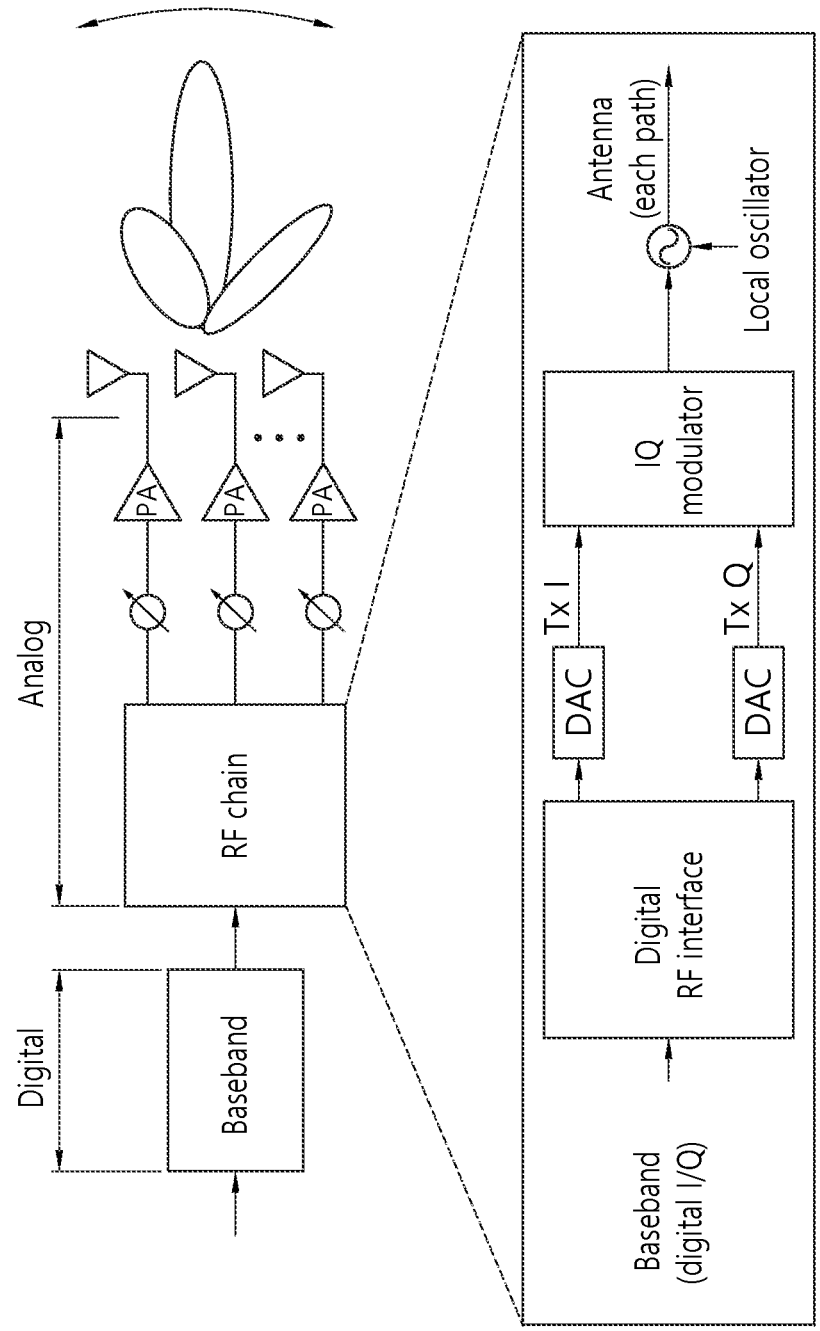
FIG. 9 shows an example of an analog beamforming to which an exemplary embodiment of the present disclosure can be applied.

FIG. 9 shows an example of an analog beamforming to which the exemplary embodiment of the present disclosure can be applied.

Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 9, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 10:
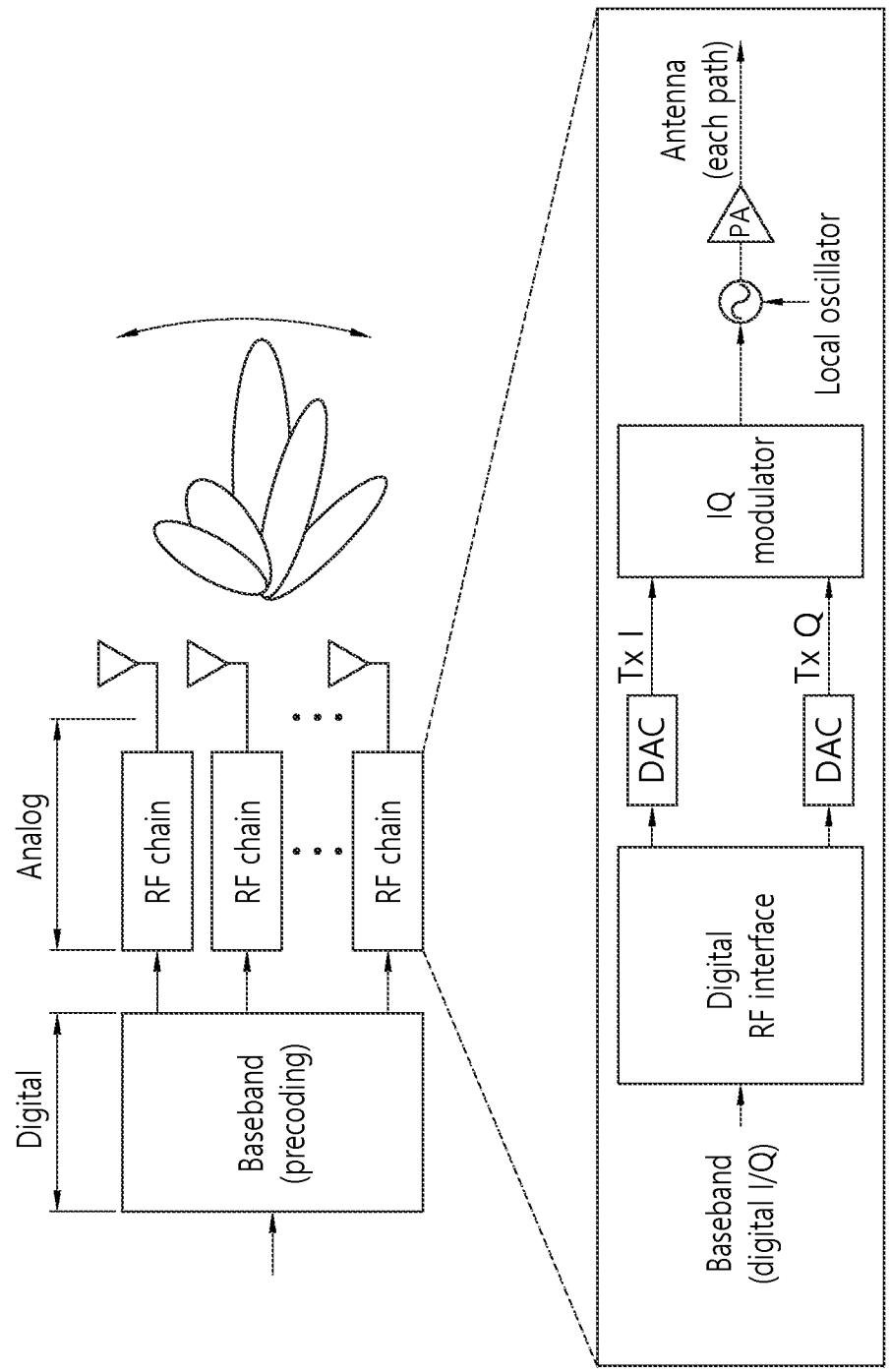
FIG. 10 shows an example of a digital beamforming to which an exemplary embodiment of the present disclosure can be applied.

FIG. 10 shows an example of a digital beamforming to which the exemplary embodiment of the present disclosure can be applied.

In digital beamforming, as opposed to analog beamforming, a beam is formed in the digital stage by a baseband process, in order to maximize diversity and multiplexing gain in an MIMO environment. Referring to FIG. 10, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user based on increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Figure 11:
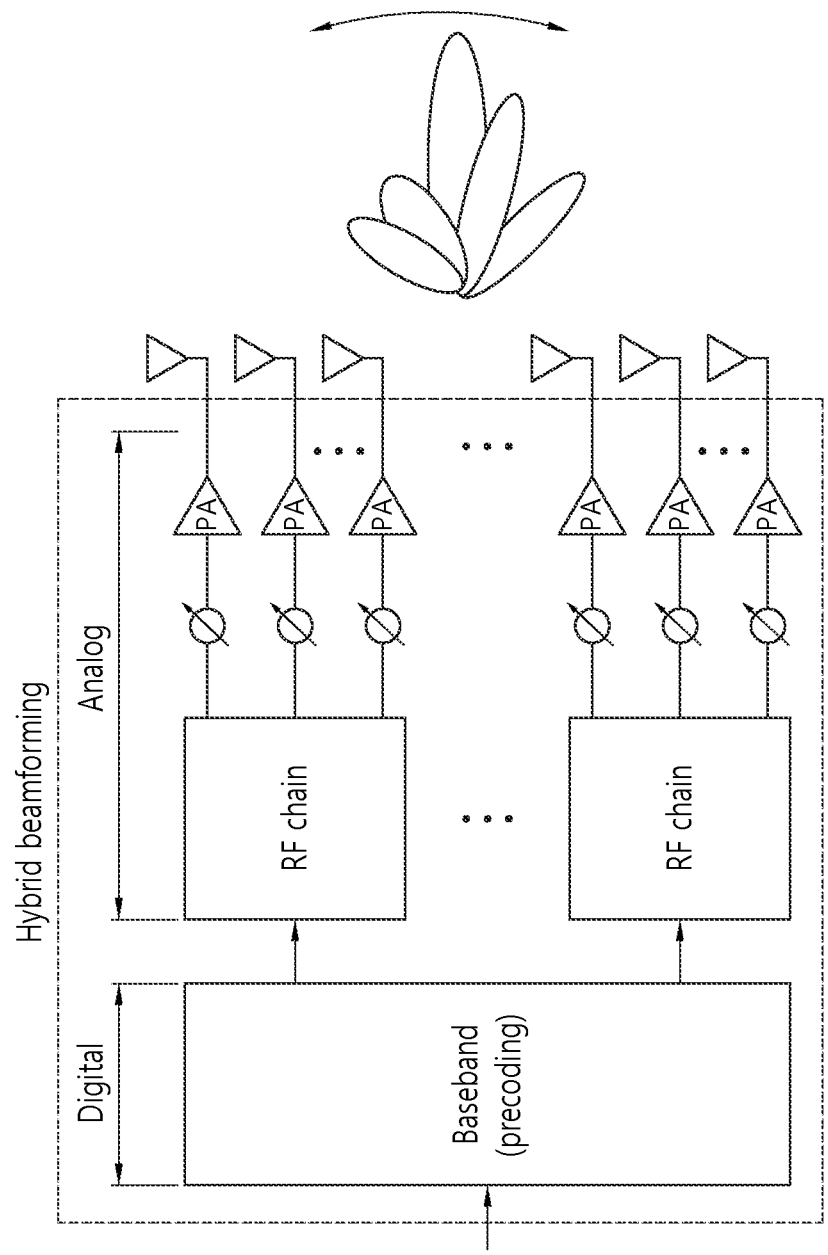
FIG. 11 shows an example of the hybrid beamforming to which an exemplary embodiment of the present disclosure can be applied.

FIG. 11 shows an example of the hybrid beamforming to which the exemplary embodiment of the present disclosure can be applied.

As described above, the hybrid beamforming is aimed at configuring a transmitting end capable of taking advantage of the advantages of analog beamforming and digital beamforming in a large MIMO environment. Referring to FIG. 11, hybrid beamforming basically forms a coarse beam through analog beamforming and forms a beam for multiple streams or multi-user transmission through digital beamforming. That is, the hybrid beamforming may have a structure for simultaneously taking the analog beamforming and the digital beamforming in order to lower the implementation complexity or the hardware complexity of the transmitting end.

In order to achieve a high data rate, the Millimeter Wave (mmW) band is being considered in the new RAT. Since the microwave band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breath of 5 cm and a length of 5 cm. If multiple antenna elements are used in the very high frequency band, the coverage can be increased and the throughput can be improved by the increase of the beamforming gain.

Hereinafter, V2X or sidelink communication will be described in detail.

FIG. 12 shows a protocol stack for a sidelink communication to which the exemplary embodiment of the present disclosure can be applied. More specifically, (a) of FIG. 12 represents a user plane protocol stack of LTE, and (b) of FIG. 12 represents a control plane protocol stack of LTE.

FIG. 13 shows a protocol stack for a sidelink communication to which the exemplary embodiment of the present disclosure can be applied. More specifically, (a) of FIG. 13 represents a user plane protocol stack of NR, and (b) of FIG. 13 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 14:
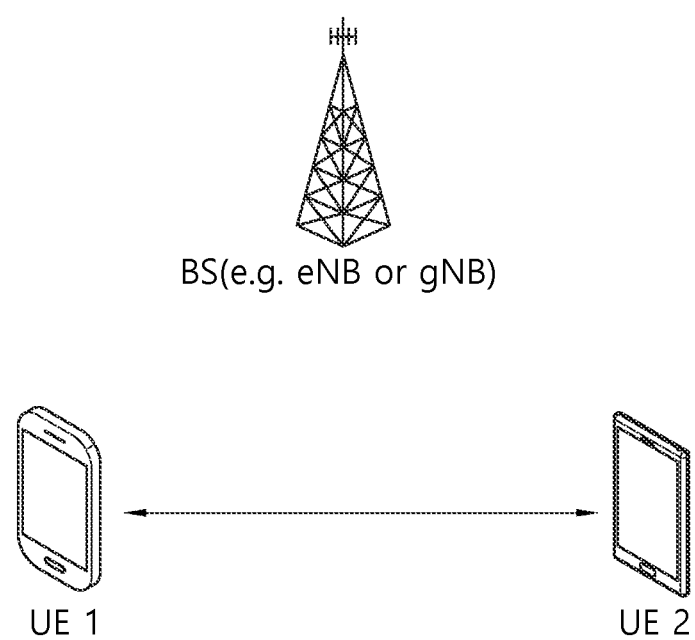
FIG. 14 shows a UE performing V2X or sidelink communication to which an exemplary embodiment of the present disclosure can be applied.

FIG. 14 shows a UE performing V2X or sidelink communication to which an exemplary embodiment of the present disclosure can be applied.

Referring to FIG. 14, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 15:
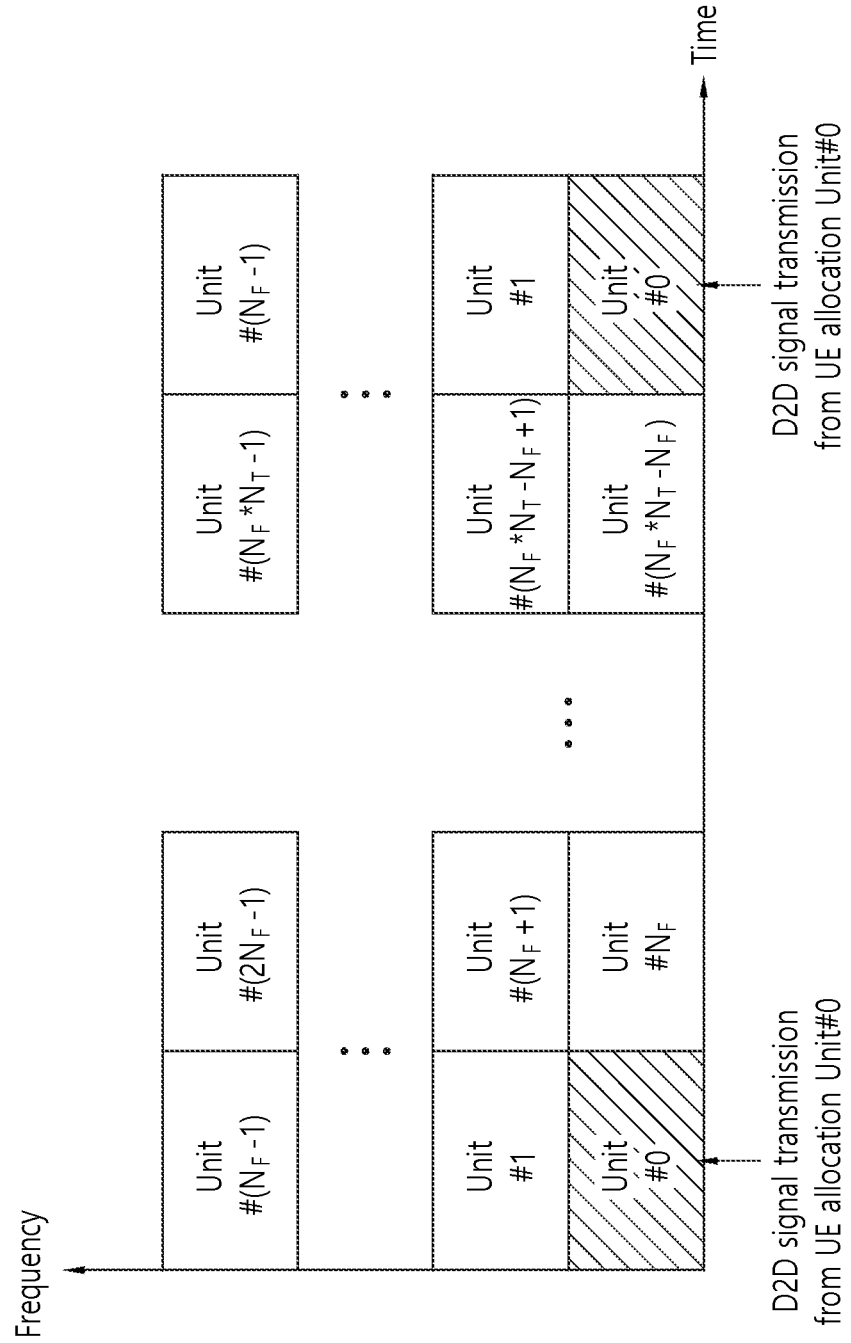
FIG. 15 shows an exemplary configuration of a resource unit to which an exemplary embodiment of the present disclosure can be applied.

FIG. 15 shows an exemplary configuration of a resource unit to which an exemplary embodiment of the present disclosure can be applied.

Referring to FIG. 15, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 15 shows an example of a case where the corresponding resource pool is repeated at a cycle of $N_T$ number of subframes.

As shown in FIG. 15, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 16:
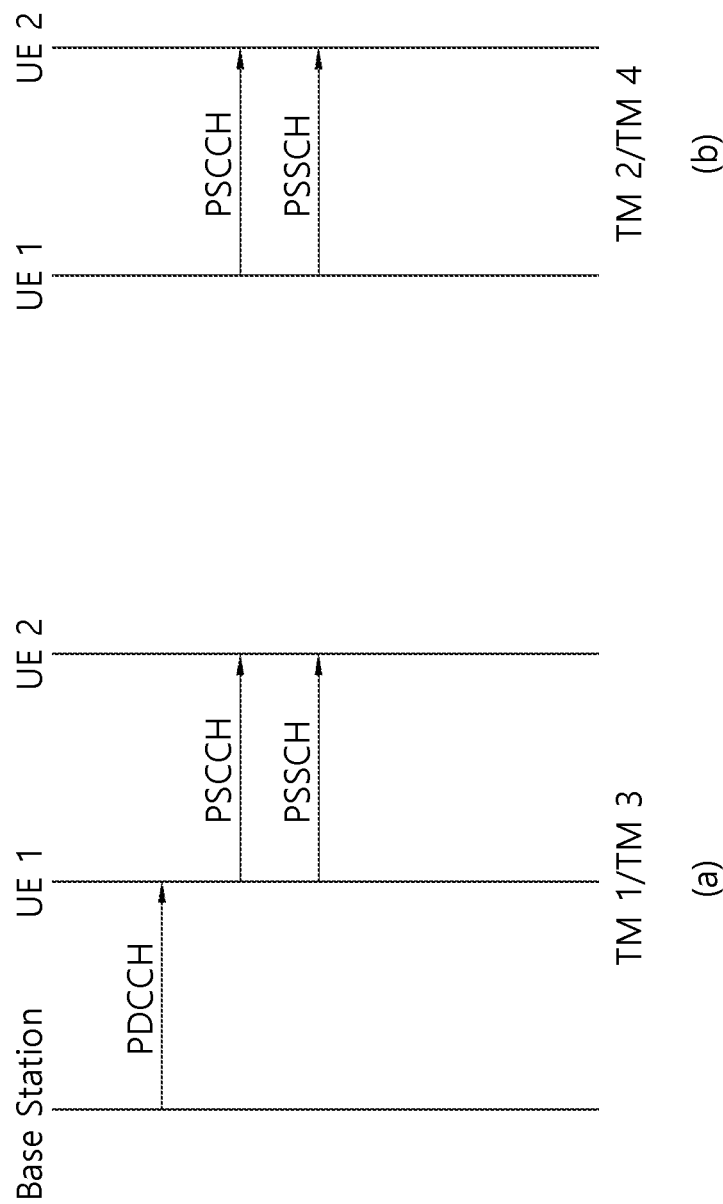
FIG. 16 shows user equipment (UE) operations according to a transmission mode (TM) being related to sidelink/V2X communication to which an exemplary embodiment of the present disclosure can be applied.

FIG. 16 shows user equipment (UE) operations according to a transmission mode (TM) being related to sidelink/V2X communication to which an exemplary embodiment of the present disclosure can be applied.

(a) of FIG. 16 represents UE operations being related to transmission mode 1 or transmission mode 3, and (b) of FIG. 16 represents UE operations being related to transmission mode 2 or transmission mode 4.

Referring to (a) of FIG. 16, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 16, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 17:
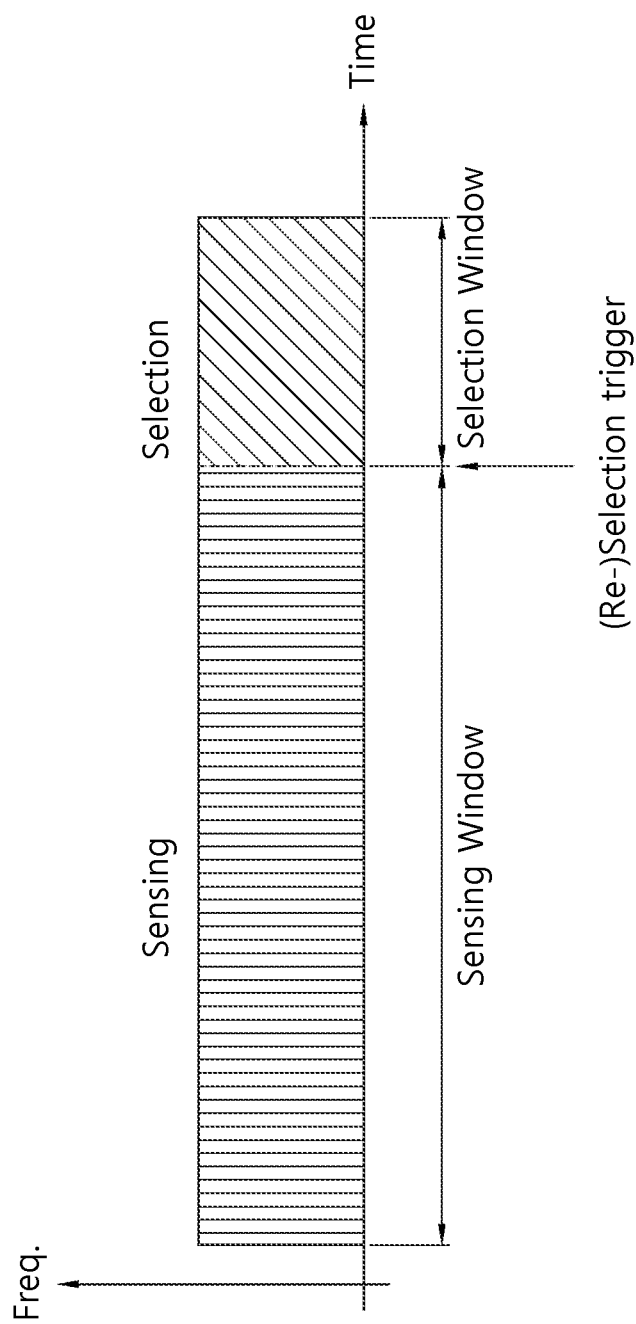
FIG. 17 shows an example where a transmission resource to which an exemplary embodiment of the present disclosure can be applied.

FIG. 17 shows an example where a transmission resource to which an exemplary embodiment of the present disclosure can be applied.

Referring to FIG. 17, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/B S.

Figure 18:
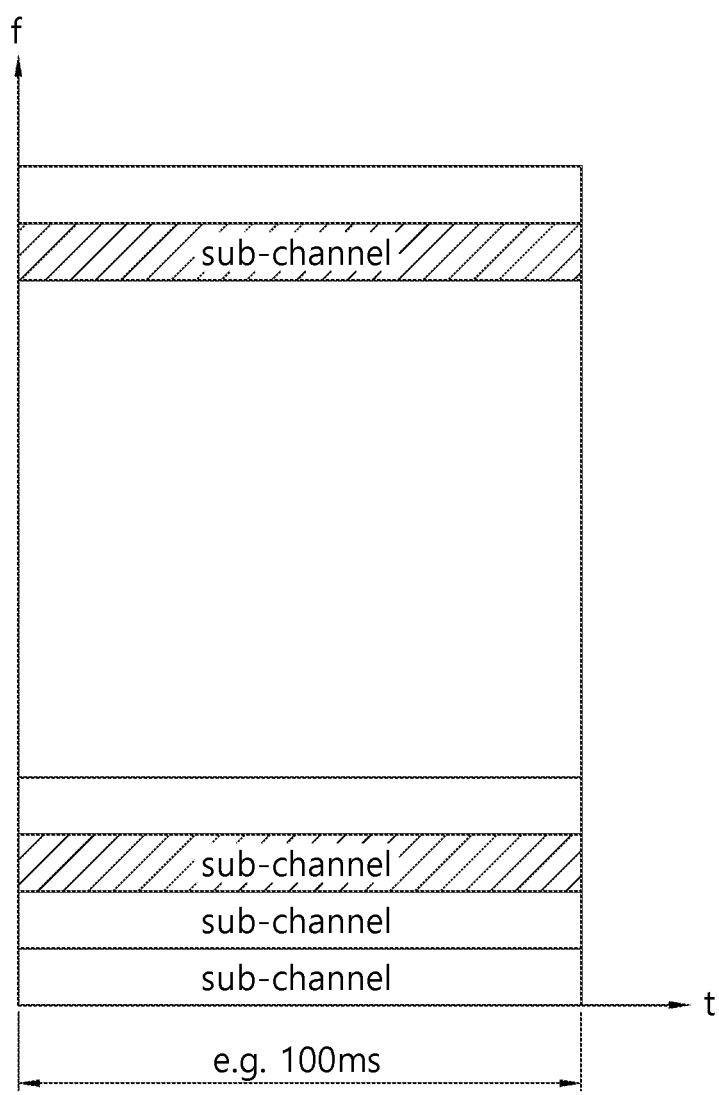
FIG. 18 shows a CBR to which an exemplary embodiment of the present disclosure can be applied.

FIG. 18 shows a CBR to which an exemplary embodiment of the present disclosure can be applied.

Referring to FIG. 18, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 18, if it is assumed that a hatched sub-channel is a sub-channel having a value greater than or equal to a pre-configured threshold, the CBR may denote a ratio of the hatched sub-channels for a period of 100 ms.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Meanwhile, in an NR system, a UE may receive information on a slot format. For example, an in-coverage UE may receive a subcarrier spacing and a TDD DL/UL pattern from a base station. For example, the TDD DL UL pattern may include a DL/UL transmission period, the number of consecutive DL slots, the number of consecutive DL symbols, the number of consecutive UL slots, and the number of consecutive UL symbols. In this case, the UE may know that the slot format is as shown in FIG. 19, based on the information on the slot format.

Figure 19:
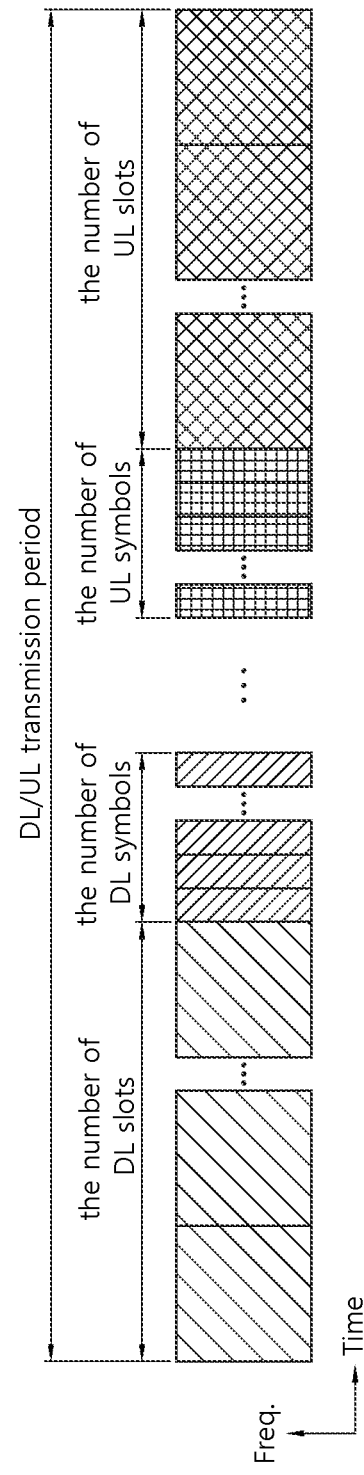
FIG. 19 shows an example of a slot format to which an embodiment of the present disclosure is applicable.

FIG. 19 shows an example of a slot format to which an embodiment of the present disclosure is applicable.

As shown in the embodiment of FIG. 19, in case of an NR system, a flexible slot format may be configured. Therefore, for example, in case of the NR system, the number of symbols constituting each of UL/DL/flexible resources in a slot may be configured to be partially or entirely different between slots or BWPs.

Accordingly, for example, under an in-coverage environment, if a V2X resource pool is configured for (some) UL resources, the number of symbols in an SL slot (constituting the V2X resource pool) may be different between slots. In addition, for example, when the V2X resource pool is configured under an out-coverage environment or the like, the number of symbols in the SL slot may be different between slots. For example, when the V2X resource pool is configured without consideration of a UL resource under the out-coverage environment or the like, the number of symbols in the SL slot may be different between slots.

In the present specification, the SL slot may include at least any one of a slot in which a UE can perform sidelink communication, a slot in which the UE can perform V2X communication, a slot in which a resource pool for a sidelink is configured, and/or a slot in which a resource pool for V2X is configured. In the present specification, an SL symbol may include at least any one of a symbol in which the UE can perform sidelink communication, a symbol in which the UE can perform V2X communication, a symbol related to sidelink communication, and/or a symbol related to a sidelink. For example, the SL symbol may include at least any one of a UL symbol and/or a flexible (F) symbol.

For example, the UE may reserve a transmission resource with a specific period, by considering a (predicted) message generation pattern, a (predicted) message generation size, a message or service-related requirement (e.g., latency, reliability), and/or message or service-related priority (e.g., PPPP (prose per-packet priority), PPPR (prose per-packet reliability)), or the like. For example, the transmission resource may be semi-statically reserved. In particular, for traffic generated periodically, the UE may reserve the transmission resource with the specific period. However, for example, if the number of SL symbols constituting the SL slot is partially or entirely different between SL slots, it may be difficult to equally maintain the number of symbols constituting the transmission resource reserved by the UE with the specific period.

Figure 20:
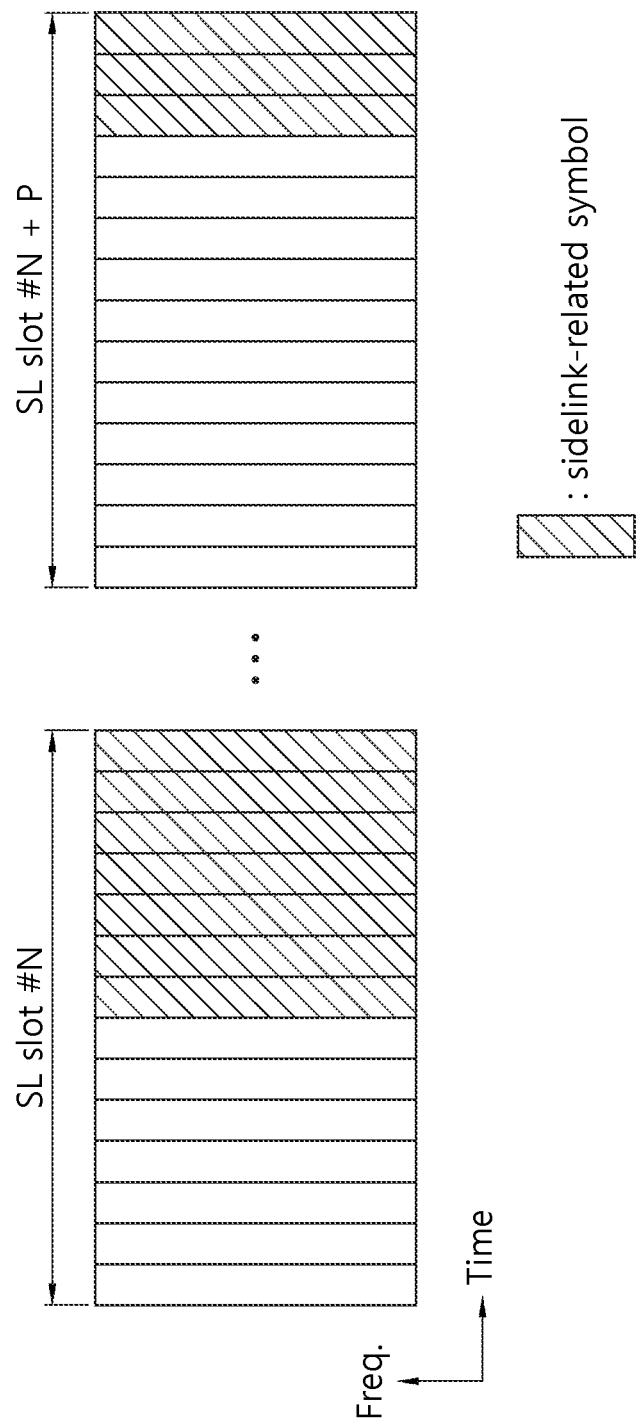
FIG. 20 is a drawing for explaining a problem which occurs due to a change in the number of symbols constituting an SL slot.

FIG. 20 is a drawing for explaining a problem which occurs due to a change in the number of symbols constituting an SL slot.

Referring to FIG. 20, it is assumed that a UE reserves a resource for sidelink transmission with a period P. In this case, a sub-channel consisting of 7 SL symbols may be present on a SL slot #N, whereas a sub-channel consisting of 3 SL symbols may be present on an SL slot #N+P. That is, the number of SL symbols may be changed between the SL slot #N and the SL slot #N+P.

In the above case, for example, there may be a problem in that a UE is unable to secure a resource amount required in message transmission at a specific timing. For example, in the embodiment of FIG. 20, the UE may be unable to stably perform sidelink communication on the SL slot #N+P, or may fail to transmit a message with high reliability. In addition, the aforementioned problem may occur not only when the UE reserves a transmission resource for transmitting a message generated periodically but also when the UE selects the transmission resource to satisfy a requirement (e.g., latency and/or reliability) of a message generated aperiodically.

Accordingly, for example, when the number of SL symbols constituting the SL slot is partially or entirely different between slots, there may be a need for a method in which the UE effectively performs sensing, resource selection, and/or resource reservation. Hereinafter, according to an embodiment of the present disclosure, there is proposed a method in which a UE performs sensing based on a resource unit and an apparatus supporting the method.

In the present specification, sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe. In the present specification, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present specification, a receiving operation of the UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or WAN DL signal (e.g., PDCCH, PDSCH, PSS/SSS, etc.). The receiving operation of the UE may include a sensing operation and/or a CBR measuring operation. In the present specification, the sensing operation of the UE may include a PSSCH-RSRP measuring operation based on a PSSCH DM-RS sequence, a PSSCH-RSRP measuring operation based on a PSSCH DM-RS sequence scheduled by a PSCCH successfully decoded by the UE, a sidelink RSSI (S-RSSI) measuring operation, and/or an S-RSSI measuring operation based on a sub-channel related to a V2X resource pool. In the present specification, a transmitting operation of the UE may include a transmitting operation of a sidelink channel and/or a sidelink signal (e.g., PSCCH, PSSCH, PSFCH, PSBCH, PSSS/SSSS, etc.). The transmitting operation of the UE may include a transmitting operation of a WAN UL channel and/or a WAN UL signal (e.g., PUSCH, PUCCH, SRS, etc.). In the present specification, a synchronization signal may include an SLSS and/or a PSBCH.

In the present specification, when the same or different messages are transmitted through a plurality of antenna panels (or a beam, or a transceiver unit, or a unit having an analog beam adjustment-related phase shifter and amplifier, or an antenna element) to which partially or entirely different antenna port (AP) indices are mapped, such a transmission type may be interpreted or regarded as a sort of multi-layer transmission type. In the present specification, when the same or different messages are transmitted through a plurality of antenna panels (or a beam or an antenna element) to which the same AP index is mapped, such a transmission type may be interpreted or regarded as a sort of single-layer transmission type.

In the present specification, for example, a beam, an antenna panel, an AP, a transceiver unit, and/or an antenna element may be interpreted mutually in an extended or crossed manner. For example, the AP may include at least any one of an AP at a baseband end, an AP related to a digital beam, an AP at an RF end, and/or an AP related to an analog beam. For example, the beam may include a set of beams, the antenna panel may include a set of antenna panels, the transceiver unit may include a set of transceiver units, and the antenna element may include a set of antenna elements. For example, the antenna panel may be a unit consisting of at least any one of (pre-configured) one or a plurality of beams, (pre-configured) one or a plurality of APs, (pre-configured) one or a plurality of transceiver units, and/or (pre-configured) one or a plurality of antenna elements.

In the present specification, a configuration may include signaling, signaling from a network, a configuration from the network, and/or a pre-configuration from the network. In the present specification, a definition may include signaling, signaling from a network, a configuration form the network, and/or a pre-configuration from the network. In the present specification, a designation may include signaling, signaling from a network, a configuration from the network, and/or a pre-configuration from the network. In the present specification, a ProSe per packet priority (PPPP) may be replaced with a ProSe per packet reliability (PPPR), and the PPPR may be replaced with the PPPP. In the present specification, it may mean that the smaller the PPPP value, the higher the priority, and that the greater the PPPP value, the lower the priority. In the present specification, it may mean that the smaller the PPPR value, the higher the reliability, and that the greater the PPPR value, the lower the reliability.

Some or all of the methods proposed in the present specification may be limited to a transmitting operation of the UE, a transmission carrier selecting operation, and/or a transmission BWP selecting operation. Alternatively, for example, some or all of the methods proposed in the present specification may be limited to a receiving operation of the UE, a reception carrier selecting operation, and/or a reception BWP selecting operation.

At least one method proposed in the present specification may apply not only to sidelink communication or V2X communication based on a PC5 interface or an SL interface (e.g., PSCCH, PSSCH, PSBCH, PSSS/SSSS, etc.) but also to sidelink communication or V2X communication based on a Uu interface (e.g., PUSCH, PDSCH, PDCCH, PUCCH, etc.).

Figure 21:
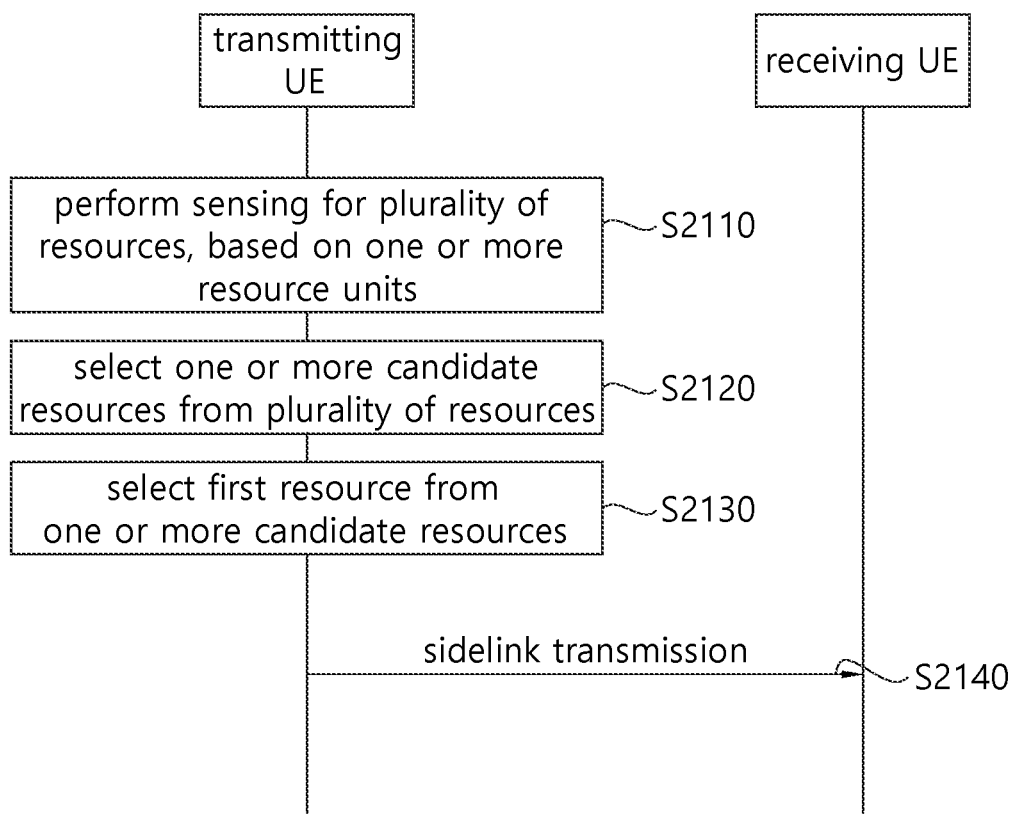
FIG. 21 shows a procedure in which a UE performs sensing based on one or more pre-configured resource units, according to an embodiment of the present disclosure.

FIG. 21 shows a procedure in which a UE performs sensing based on one or more pre-configured resource units, according to an embodiment of the present disclosure.

Referring to FIG. 21, in step S2110, the UE may perform sensing, based on a resource unit consisting of one or more symbols. For example, the UE may perform sensing for a plurality of resources or total resources, based on the resource unit including one or more symbols. For example, the sensing operation of the UE may include at least any one of an RSRP measurement operation and/or S-RSSI measurement operation for a PSSCH. In the present specification, for convenience of explanation, the resource unit may be referred to as BASIC_SS. For example, a PHY layer of the UE may perform sensing for the plurality of resources or total resources, based on the BASIC_SS.

For example, the number of symbols constituting the BASIC_CC may be configured for the UE or may be pre-configured. For example, the BASIC_SS may consist of a combination of one or more symbols or one or more subcarriers. For example, one BASIC_SS may be configured for the UE or may be pre-configured. For example, a plurality of BASIC_SSs may be configured for the UE or may be pre-configured.

For example, when the plurality of BASIC_SSs are configured, the number of BASIC_SSs may be the same number as that of categories for the number of SL symbols constituting the SL slot. For example, when the plurality of BASIC_SSs are configured, the number of BASIC_SSs may be the same number as that of categories for the number of SL symbols constituting the SL slot in a V2X resource pool. For example, it is assumed that the V2X resource pool includes a first SL slot, a second SL slot, and a third SL slot. In addition, it is assumed that the first SL slot includes 4 SL symbols, the second SL slot includes 7 SL symbols, and the third SL slot includes 14 SL symbols. In this case, since there are 3 categories (i.e., 4, 7, and 14) for the number of SL symbols, the number of BASIC_SSs may be set to 3.

For example, when the plurality of BASIC_SSs are configured, the number of BASIC_SSs may be less than that of the categories for the number of SL symbols constituting the SL slot. For example, when the plurality of BASIC_SSs are configured, the number of BASIC_SSs may be less than that of the categories for the number of SL symbols constituting the SL slot to decrease sensing complexity.

For example, an SL slot or resource in which sensing is performed with the BASIC_SS having a specific symbol count may be limited to an SL slot or resource of which a symbol count is equal to the specific symbol count. For example, the UE may perform sensing only for an SL slot or resource of which a symbol count is equal to the number of symbols constituting the BASIC_SS. For example, assuming that the BASIC_SS includes 5 symbols, the UE may perform sensing only for an SL slot or resource including 5 SL symbols.

For example, the SL slot or resource in which sensing is performed with the BASIC_SS having a specific symbol count may be limited to an SL slot or resource of which a symbol count difference (against the specific symbol count) is a first symbol count. For example, the first symbol count may be configured for the UE, or may be pre-configured. For example, the UE may perform sensing only for an SL slot or resource of which a symbol count difference against the number of symbols constituting the BASIC_SS is less than or equal to the first symbol count. For example, if it is assumed that the BASIC_SS includes 5 symbols and the first symbol count is 2, the UE may perform sensing for an SL slot or resource including 3 to 7 SL symbols. Alternatively, for example, if it is assumed that the BASIC_SS includes 5 symbols and the first symbol count is 2, the UE may perform sensing for an SL slot or resource including 3 to 5 SL symbols.

For example, the number of BASIC_SSs and/or the number of symbols constituting the BASIC_SS may be configured independently or differently according to at least any one of a V2X resource pool, a service type, a service requirement, a service priority, a message type (e.g., a message generated periodically or a message generated periodically), a PPPP, a PPPR, a priority of a logical channel, an identifier of the logical channel, and/or a numerology, or may be limited.

According to sensing for a plurality of resources or total resources, performed based on the BASIC_SS, in step S2120, the UE may select a candidate resource from the plurality of resources or total resources.

For example, a PHY layer of the UE may perform sensing for the total resources, based on the BASIC_SS, and the PHY layer of the UE may report a candidate resource of a pre-configured ratio among the total resources to a MAC layer of the UE. In the present specification, for convenience of explanation, the pre-configured ratio may be referred to as CANDI_RATIO. For example, the candidate resource may be a resource selectable by the UE and/or a resource with relatively less interference.

When one BASIC_SS is configured for the UE, the number of symbols constituting (all) candidate resources reported by the PHY layer of the UE to the MAC layer of the UE may be identical. Alternatively, when one BASIC_SS is configured for the UE, a difference in the number of symbols constituting (all) candidate resources reported by the PHY layer of the UE to the MAC layer of the UE may not exceed a pre-configured value or a pre-configured range.

For example, the total resources may consist of only a resource of which a symbol count is equal to the symbol count of the BASIC_SS. For example, when one BASIC_SS or a plurality of BASIC_SSs are configured for the UE, the total resources may limitedly consist of only a resource of which a symbol count is equal to the symbol count of the BASIC_SS. For example, the total resources may consist of only a resource of which a symbol count difference against the symbol count of the BASIC_SS is less than a pre-configured difference. For example, when one BASIC_SS or a plurality of BASIC_SSs are configured for the UE, the total resources may limitedly consist of only a resource of which a symbol count difference against the symbol count of the BASIC_SS is less than the pre-configured difference.

For example, when the plurality of BASIC_SSs are configured for the UE, the CANDI_RATIO may be uniformly split between the plurality of BASIC_SSs. For example, it is assumed that a first BASIC_SS and a second BASIC_SS are configured for the UE, and the CANDI_RATIO is 20%. In this case, the CANDI_RATIO related to the first BASIC_SS may be 10%, and the CANDI_RATIO related to the second BASIC_SS may be 10%. Therefore, the PHY layer of the UE may report a candidate resource of 10% among resources sensed based on the first BASIC_SS to the MAC layer of the UE, and the PHY layer of the UE may report a candidate resource of 10% among resources sensed based on the second BASIC_SS to the MAC layer of the UE.

For example, when the plurality of BASIC_SSs are configured for the UE, the CANDI_RATIO may be applied independent of the plurality of BASIC_SSs. For example, when the first BASIC_SS and the second BASIC_SS are configured for the UE, the CANDI_RATIO related to the first BASIC_SS may be 20%, and the CANDI_RATIO related to the second BASIC_SS may be 20%. Therefore, the PHY layer of the UE may report a candidate resource of 20% among resources sensed based on the first BASIC_SS to the MAC layer of the UE, and the PHY layer of the UE may report a candidate resource of 20% among resources sensed based on the second BASIC_SS to the MAC layer of the UE.

For example, when the plurality of BASIC_SSs are configured for the UE, the CANDI_RATIO may be split between the BASIC_SSs according to a pre-configured ratio. For example, it is assumed that the first BASIC_SS and the second BASIC_SS are configured for the UE, and the CANDI_RATIO is 30%. In addition, it is assumed that a ratio of the CANDI_RATIO related to the first BASIC_SS and the CANDI_RATIO related to the second BASIC_SS is 1:2. In this case, the CANDI_RATIO related to the first BASIC_SS may be 10%, and the CANDI_RATIO related to the second BASIC_SS may be 20%. Therefore, the PHY layer of the UE may report a candidate resource of 10% among resources sensed based on the first BASIC_SS to the MAC layer of the UE, and the PHY layer of the UE may report a candidate resource of 20% among resources sensed based on the second BASIC_SS to the MAC layer of the UE.

In step S2130, the UE may select at least one resource from one or more candidate resources.

For example, when one BASIC_SS is configured for the UE, among the plurality of resources, the one transmission resource may be selected from candidate resources selected based on a pre-configured ratio.

For example, when the plurality of BASIC_SSs (e.g., the first BASIC_SS and the second BASIC_SS) are configured for the UE, among the plurality of resources, the one transmission resource may be selected from candidate resources selected based on the CANDI_RATIO related to the first BASIC_SS or candidate resources selected based on the CANDI_RATIO related to the second BASIC_SS. For example, when a transmission resource related to the number of symbols included in the first BASIC_SS is required in sidelink transmission, the one transmission resource may be selected from candidate resources selected based on the CANDI_RATIO related to the first BASIC_SS. For example, in order for the UE to successfully perform sidelink transmission or to satisfy a service requirement, if the number of required transmission resources is equal to the number of symbols included in the first BASIC_SS, the one transmission resource may be selected from candidate resources selected based on the CANDI_RATIO related to the first BASIC_SS. For example, when a transmission resource related to the number of symbols included in the second BASIC_SS is required in sidelink transmission, the one transmission resource may be selected from candidate resources selected based on the CANDI_RATIO related to the second BASIC_SS. For example, in order for the UE to successfully perform sidelink transmission or to satisfy a service requirement, if the number of required transmission resources is equal to the number of symbols included in the second BASIC_SS, the one transmission resource may be selected from candidate resources selected based on the CANDI_RATIO related to the second BASIC_SS.

In addition, in step S2140, the UE may perform sidelink transmission by using the selected resource. In the present specification, the sidelink transmission may include at least any one of transmission of a sidelink channel, transmission of sidelink control information, transmission of sidelink data, transmission of a sidelink packet, transmission of a sidelink service, and/or transmission of a sidelink message. For example, a MAC layer of the UE may perform message transmission by selecting one candidate resource from one or more candidate resources.

According to an embodiment of the present disclosure, due to a flexible slot format, even if the number of SL symbols is different between SL slots, the UE may perform effective sensing based on a resource unit.

According to an embodiment of the present disclosure, a transmitting UE which has reserved a transmission resource may transmit information on a reservation period of the transmission resource and information on the number of symbols of the reserved transmission resource to a receiving UE. Additionally, the transmitting UE which has reserved the transmission resource may transmit information on the number of sub-channels related to the transmission resource to the receiving UE. In the present specification, for convenience of explanation, the information on the reservation period of the transmission resource may be referred to as P_VAL, and the information on the number of symbols of the transmission resource may be referred to as RES_S-NUM.

For example, the transmitting UE may additionally signal not only the P_VAL but also the RES_SNUM on a control channel (e.g., PSCCH). Herein, for example, when a corresponding rule is applied, the receiving UE which has received the control channel on the SL slot #N may assume next transmission (of the transmitting UE) or a next transmission resource according to the following rule.

For example, when the SL slot #N+P_VAL includes symbols of which a symbol count is the RES_SNUM, the receiving UE may assume that next transmission of the transmitting UE is performed on the SL slot #N+P_VAL. Alternatively, for example, when the SL slot #N+P_VAL includes symbols of which a symbol count difference against the RES_SNUM is less than a pre-configured difference, the receiving UE may assume that next transmission of the transmitting UE is performed on the SL slot #N+P_VAL. In this case, the transmitting UE may perform next transmission on the SL slot #N+P_VAL.

For example, when the SL slot #N+P_VAL does not include symbols of which a symbol count is the RES_S-NUM, or when the SL slot #N+P_VAL does not include symbols of which a symbol count difference against the RES_SNUM is less than the pre-configured difference, the receiving UE may assume that next transmission of the transmitting UE is performed on an SL other than the SL slot #N+P_VAL. For convenience of explanation, the SL slot other than the SL slot #N+P_VAL may be referred to as a specific SL slot. Herein, for example, the specific SL slot may be a closest SL slot of which a symbol count is the RES_SNUM or of which a symbol count difference against the RES_SNUM is less than the pre-configured difference, among slots before and/or after the SL slot #N+P_VAL. In this case, the transmitting UE may perform next transmission on the specific SL slot. For example, the specific SL slot may be a slot located on the SL slot #N+P_VAL+SHIFT. For example, the specific SL slot may be a slot located on the SL slot #N+P_VAL−SHIFT.

For example, SHIFT may be a shifting value related to next transmission of the transmitting UE. For example, the SHIFT value may be a positive number. For example, the transmitting UE may signal the SHIFT value on the control channel. For example, the transmitting UE may directly signal the SHIFT value on the control channel on the SL slot #N.

For example, a location of an SL slot in which the transmitting UE performs next transmission may vary depending on whether the SL slot #N+P_VAL*2 includes symbols of which a symbol count is the RES_SNUM or of which a symbol count difference against the RES_SNUM is less than a pre-configured difference. Alternatively, for example, the location in which the transmitting UE performs next transmission may vary depending on whether the SL slot #N+P_VAL*2+SHIFT includes symbols of which a symbol count is the RES_SNUM or of which a symbol count difference against the RES_SNUM is less than the pre-configured difference. Alternatively, for example, the location of the SL slot in which the transmitting UE performs next transmission may vary depending on whether the SL slot #N+P_VAL*2−SHIFT includes symbols of which a symbol count is the RES_SNUM or of which a symbol count difference against the RES_SNUM is less than a pre-configured difference.

For example, when the transmitting UE performs next transmission on the SL slot #N+P_VAL+SHIFT, the receiving UE which has first received the control channel on the SL slot #N+P_VAL+SHIFT may not know that next transmission of the transmitting UE is determined based on the number of symbols on the SL slot #N+P_VAL*2. For example, as described above, if the SL slot #N+P_VAL does not include the symbols of which the symbol count is the RES_SNUM or of which the symbol count difference against the RES_SNUM is less than the pre-configured difference, the transmitting UE may perform next transmission on the SL slot #N+P_VAL+SHIFT. In this case, the receiving UE which has first received the control channel on the SL slot #N+P_VAL+SHIFT may not know that next transmission of the transmitting UE is determined based on the number of symbols on the SL slot #N+P_VAL*2. To solve such a problem, the transmitting UE may additionally signal information on an offset (e.g., (SL slot #N+P_VAL+SHIFT)−(SL slot #N+P_VAL)=SHIFT) between a reference timing (e.g., SL slot #N+P_VAL) and a shifting timing (e.g., SL slot #N+P_VAL+SHIFT). For example, the transmitting device which transmits the control channel on the SL slot #N+P_VAL+SHIFT may transmit the information on the offset to the receiving UE.

According to an embodiment of the present disclosure, due to a flexible slot format, when the UE cannot perform SL transmission through the reserved resource, the UE may perform SL transmission on a resource located before or after the reserved resource. Therefore, even if the number of SL symbols is changed due to the change in the slot format, the UE may effectively transmit a sidelink service related to a high priority and/or a sidelink service having a low latency requirement.

According to an embodiment of the present disclosure, when at least any one of the following conditions is satisfied, the transmitting UE may omit transmission on the SL slot #N. Additionally/alternatively, when at least any one of the following conditions is satisfied, the receiving UE may omit reception on related transmission on the SL slot #N.

If the number of SL symbols included in the SL slot #N is less than the number of symbols of a transmission resource reserved by the UE (when performing resource re-reservation), and/or If the number of SL symbols included in the SL slot #N is less than the number of symbols of the transmission resource reserved by the UE (when performing resource re-reservation) and a symbol count difference is greater than a pre-configured threshold, and/or If an (effective) coding rate derived based on the transmission resource reserved by the UE (when performing resource re-reservation) cannot be supported with the number of SL symbols included in the SL slot #N, and/or If the (effective) coding rate lower than the pre-configured threshold cannot be supported with the number of SL symbols included in the SL slot #N, and/or If the (effective) coding rate derived based on the transmission resource reserved by the UE (when performing resource re-reservation) cannot be supported with the number of SL symbols included in the SL slot #N and a symbol count difference is greater than the pre-configured threshold.

Herein, for example, the threshold may be configured independently or differently according to at least any one of a V2X resource pool, a BWP, a service type, a service requirement, a service priority, a message type (e.g., a message generated periodically or a message generated aperiodically), a PPPP, a PPPR, a priority of a logical channel, an identifier of the logical channel, and/or a numerology.

According to an embodiment of the present disclosure, when a resource amount required by the UE to transmit a message is not (sufficiently) secured on the SL slot #N, for example, when the number of SL symbols included on the SL slot #N is small, the UE may reserve and/or select a transmission resource by additionally using a resource on an SL slot adjacent to the SL slot #N. For example, the UE may reserve and/or select the transmission resource by additionally using some resources on an SL slot located before and/or after the SL slot #N. Herein, for example, a code block group (CBG) index transmitted on the different SL slot and/or a CBG count may be different, and corresponding information may be signaled through a control channel (e.g., a PSCCH) transmitted on each SL slot. Herein, for example, an indicator field for notifying that a CBG or information transmitted through a resource on a plurality of SL slots constitutes the same TB may be defined on the control channel.

According to an embodiment of the present disclosure, at least any one of a resource for transmitting a specific channel, a resource for transmitting a specific signal, and/or a specific resource may not be designated or configured as a V2X resource pool. For example, the specific channel or the specific signal may be a channel or signal for communication between a base station and a UE. Herein, for example, the resource which cannot be designated or configured as the V2X resource pool may be regarded as at least any one of a slot in which transmission of the specific channel is configured, a slot in which transmission of the specific signal is configured, and/or a slot in which the specific resource is to be configured. For example, the specific channel, the specific signal, and/or the specific resource may include at least any one of channels, signals, and/or resources listed below.

contention-based PRACH or contention-free-based PRACH, and/or periodic SRS, aperiodic SRS, single-shot SRS, multi-shot SRS, and/or grant-free (UL) SPS, for example, type 1 grant-free (UL) SPS or type 2 grant-free (UL) SPS, and/or unknown/reservation resource, and/or synchronization signal/PBCH block (SSB)

In the present specification, the unknown/reservation resource may mean a resource which is not used for a UL/DL/flexible usage.

According to an embodiment of the present disclosure, for example, the V2X resource pool may be configured (limitedly) only for the UL resource and/or the unknown/reservation resource. For example, the resource may be designated through semi-static D/U assignment signaling. For example, the D/U assignment may be signaled in a cell-specific manner. For example, the D/U assignment may be signaled in a UE-specific manner.

According to an embodiment of the present disclosure, when the UE transmits a plurality of transport blocks (TBs) through a PSSCH based on a plurality of APs or a plurality of layers, a PPPP value may be partially or entirely different between a plurality of TBs.

For example, when the PPPP value is partially or entirely different between the plurality of TBs, the UE may determine a smallest PPPP value as a representative PPPP value (hereinafter, REP_PPPP) among the plurality of PPPP values. Alternatively, for example, the UE may determine a greatest PPPP value as the REP_PPPP among the plurality of PPPP values. Alternatively, for example, the UE may determine a PPPP value of a TB related to a pre-configured service as the REP_PPPP among the plurality of PPPP values. Alternatively, for example, the UE may determine a pre-configured PPPP value as the REP_PPPP among the plurality of PPPP values. In addition, the UE may signal the REP_PPPP on a PSCCH. For example, when the PPPP value is partially or entirely different between a plurality of TBs, the UE may signal (all of) at least any one of a PPPP value for each TB, a PPPP value for each AP, and/or a PPPP value for each layer on the PSCCH. Herein, for example, it is assumed that the UE performs PSCCH transmission based on one AP or one layer.

For example, when the UE performs a congestion control (e.g., a radio layer parameter restriction and/or adjustment) based on a CBR measurement value, the UE may use the REF PPPP value. Alternatively, for example, the UE may use a greatest PPPP value among PPPP values related to a plurality of TBs. Alternatively, for example, the UE may use a smallest PPPP value among PPPP values related to a plurality of TBs. Alternatively, for example, the UE may use a PPPP value of a TB related to a pre-configured service. Alternatively, for example, the UE may use a pre-configured PPPP value.

For example, when the UE performs sensing, for example, when the UE performs sensing for selecting a transmission resource, the UE may use the REP_PPPP value. Alternatively, for example, the UE may use a greatest PPPP value among PPPP values related to a plurality of TBs. Alternatively, for example, the UE may use a smallest PPPP value among PPPP values related to a plurality of TBs. Alternatively, for example, the UE may use a PPPP value of a TB related to a pre-configured service. Alternatively, for example, the UE may use a pre-configured PPPP value.

For example, when the UE distributes transmit power between carriers and/or BWPs, for example, when a sum of power required to simultaneously transmit a channel and/or a signal on a plurality of carriers and/or a plurality of BWPs exceeds a maximum transmit power value of the UE, the UE may use the REF PPPP value. Alternatively, for example, the UE may use a greatest PPPP value among PPPP values related to a plurality of TBs. Alternatively, for example, the UE may use a smallest PPPP value among PPPP values related to a plurality of TBs. Alternatively, for example, the UE may use a PPPP value of a TB related to a pre-configured service. Alternatively, for example, the UE may use a pre-configured PPPP value.

For example, when the UE performs CR measurement, multi-TB transmission may be regarded and/or considered in a CR value as (single-)TB transmission related to the REP_PPPP value. Alternatively, for example, the multi-TB transmission may be regarded and/or considered in a CR value as transmission of the number (i.e., NUM_PPTB) of TBs related to a different PPPP value. For example, in this case, it may be configured that transmission for each PPPP is normalized with the NUM_PPTB and then considered in each CR value. Alternatively, a pre-configured (relatively) high weight may be applied to TB transmission related to a specific PPPP value which uses relatively many layers or APs. Alternatively, a pre-configured (relatively) low weight may be applied to TB transmission related to a specific PPPP value which uses relatively many layers or APs.

In addition, for example, the UE may independently perform a sensing operation, a congestion control operation based on a CBR measurement value, and/or a CR measurement operation for each AP. Alternatively, for example, the UE may independently perform a sensing operation, a congestion control operation based on a CBR measurement value, and/or a CR measurement operation for each layer. Alternatively, for example, the UE may independently perform a sensing operation, a congestion control operation based on a CBR measurement value, and/or a CR measurement operation for each TB. For example, when the UE performs a sensing operation, a congestion control operation based on a CBR measurement value, and/or a CR measurement operation for each AP and/or TB, the UE may consider a PPPP value or (common) REP_PPPP value for each AP, layer, and/or TB.

In the present specification, for example, the radio layer parameter restriction and/or adjustment may include at least any one of maximum transmit power (including zero power transmission), a range of a retransmission count for each TB, a range of a PSSCH resource block, a range of an MCS, and/or a maximum limit on occupancy ratio (CR_LIMIT). In addition, the radio layer parameter restriction and/or adjustment may be configured differently or independently for each combination of a CBR value and a PPPP value (of a message).

According to an embodiment of the present disclosure, if a resource consisting of K symbols (e.g., a frequency resource consisting of K symbols) is designated for the purpose of transmitting a sidelink synchronization signal and/or a PSBCH, the resource or the number of SL symbols related to the resource may always be guaranteed. For example, if the resource consisting of the K symbols in the SL symbol is designated for the purpose of transmitting the sidelink synchronization signal and/or the PSBCH, the resource or the number of SL symbols related to the resource may always be guaranteed regardless of a change in a format of the SL slot. For example, if the resource consisting of the K symbols in the SL slot is designated for the purpose of transmitting the sidelink synchronization signal, the PSBCH, a pre-configured specific channel, and/or a pre-configured specific signal, then the resource or the number of SL symbols related to the resource may always be guaranteed regardless of the change in the format of the SL slot.

Meanwhile, if there are many SL symbols in the SL slot, more symbols may be allocated for a control channel, compared to a case where there are few SL symbols in the SL slot. For example, the number of PSCCH-related symbols may be 3 when there are 14 SL symbols in the SL slot, whereas the number of PSCCH-related symbols may be 1 when there are 7 SL symbols in the SL slot. Therefore, in case of the aforementioned example, there is a need to change the DM-RS pattern related to the PSCCH.

Therefore, according to an embodiment of the present disclosure, for example, a DM-RS pattern of a control channel (e.g., PSCCH) or a DM-RS pattern of a pre-configured channel/signal may be configured for the UE for each number of symbols constituting a corresponding channel/signal or may be pre-configured. For example, the DM-RS pattern may be configured in a semi-static manner for each number of symbols constituting the channel and/or signal. Herein, for example, when the rule is applied, complexity of blind detection of the UE may be decreased. For example, when the rule is applied, complexity of blind detection for detecting the DM-RS pattern by the UE may be decreased. For example, since the UE knows the DM-RS pattern for each number of symbols constituting the channel and/or signal, the UE may not perform complex blind detection to detect the DM-RS pattern.

In addition, according to an embodiment of the present disclosure, for example, the number of symbols constituting the control channel or the pre-configured channel/signal may be configured for the UE or may be pre-configured. For example, the number of symbols may be configured in a semi-static manner.

For example, the DM-RS pattern and/or the number of symbols constituting the channel/signal may be configured independently or differently according to at least any one of a V2X resource pool, a BWP, a service type, a service requirement, a service priority, a message type (e.g., a message generated periodically or a message generated aperiodically), a PPPP, a PPPR, a priority of a logical channel, an identifier of the logical channel, and/or a numerology.

Figure 22:
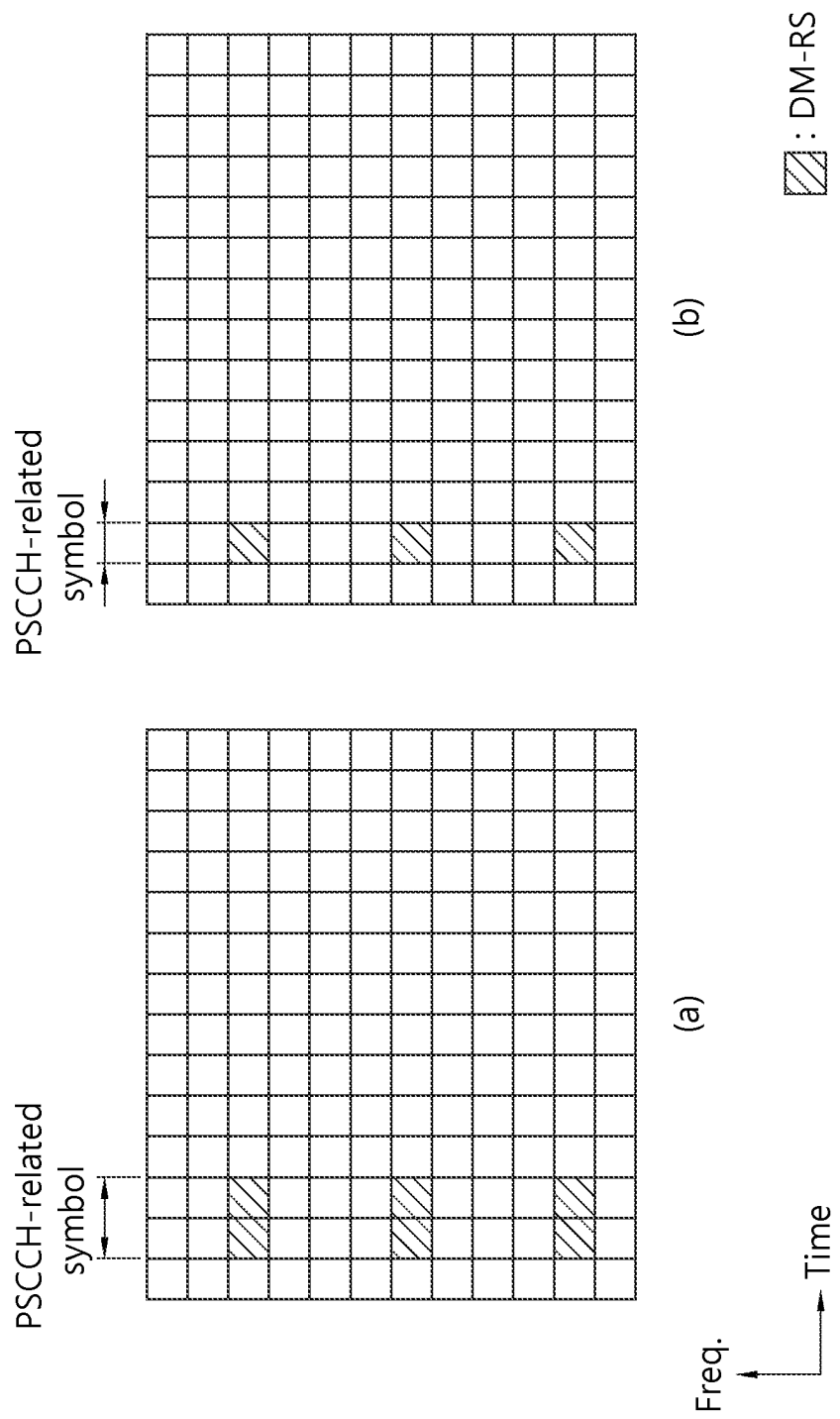
FIG. 22 shows an example in which a DM-RS pattern is configured differently for each number of symbols constituting a channel, according to an embodiment of the present disclosure.

FIG. 22 shows an example in which a DM-RS pattern is configured differently for each number of symbols constituting a channel, according to an embodiment of the present disclosure.

Referring to (a) and (b) of FIG. 22, a DM-RS pattern may be configured differently for each number of symbols constituting a PSCCH. Although the PSCCH is taken for example for convenience of explanation, the technical idea of the present disclosure is not limited thereto. That is, the DM-RS pattern may be configured for the UE or may be pre-configured, for each number of symbols constituting a control channel or a pre-configured channel/signal. In addition, the DM-RS pattern shown in the embodiment of FIG. 22 is for exemplary purposes only, and the DM-RS pattern may be defined in various forms.

Meanwhile, for example, in case of an NR system, after a UL SPS time/frequency resource (i.e., ULSPS_RSC) is configured for the UE through RRC signaling or (activation) DCI, if the number of symbols related to the ULSPS_RSC is changed or not guaranteed on a specific slot, the UE may omit UL SPS transmission on the specific slot. Herein, for example, in case of a V2X service having a relatively low latency and/or high reliability, it may not be desirable to operate in this manner.

Therefore, according to an embodiment of the present disclosure, in a case where an uplink semi persistent scheduling (UL SPS) time/frequency resource is configured for the UE for the purpose of V2X communication, even if the number of symbols related to the resource is changed on a specific slot, the UE may perform UL SPS transmission when at least any one of the following conditions is satisfied. For example, when at least any one of the following conditions is satisfied, the UE may perform UL SPS transmission on the specific slot by applying rate matching or puncturing for the changed number of symbols.

If a coding rate required for UL SPS transmission does not exceed a pre-configured (effective) coding rate, and/or If there is no increase in the (effective) coding rate against previous transmission, and/or If an increase in the (effective) coding rate against previous transmission does not exceed a pre-configured threshold, and/or If the changed or decreased number of symbols is less than the pre-configured threshold, and/or If a DM-RS pattern of initial transmission can be maintained.

Figure 23:
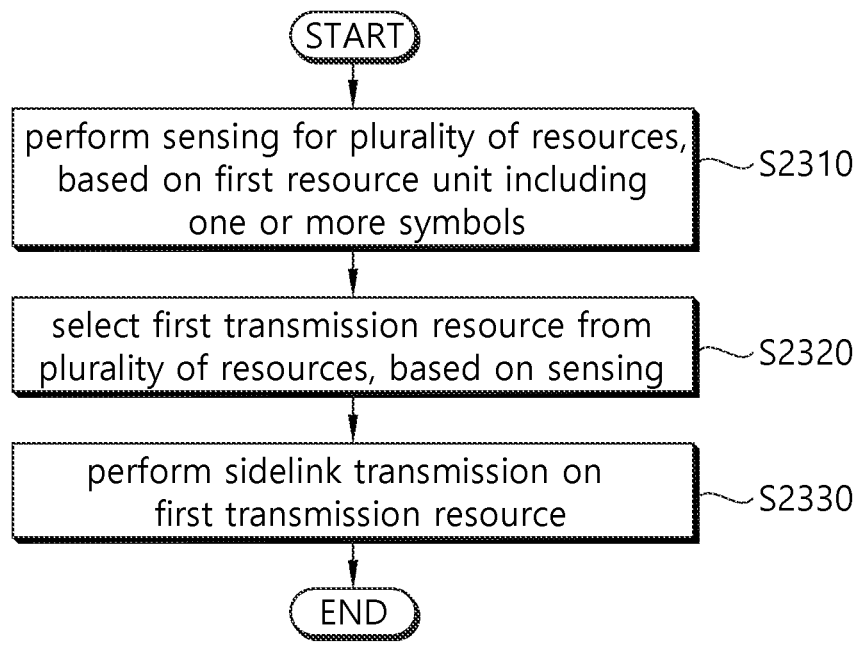
FIG. 23 shows a method in which a first device 100 performs sidelink transmission, according to an embodiment of the present disclosure.

FIG. 23 shows a method in which the first device 100 performs sidelink transmission, according to an embodiment of the present disclosure.

Referring to FIG. 23, in step S2310, the first device 100 may perform sensing for a plurality of resources, based on a first resource unit including one or more symbols.

For example, the sensing may be performed for a resource in which the number of sidelink-related symbols is equal to the number of symbols included in the first resource unit. For example, the sensing may be performed for a resource in which a difference between the number of the sidelink-related symbols and the number of symbols included in the first resource unit is less than or equal to a pre-configured number.

For example, the plurality of resources may be a set of resources in which the number of sidelink-related symbols is equal to the number of symbols included in the first resource unit. For example, the plurality of resources may be a set of resources in which a difference between the number of sidelink-related symbols and the number of symbols included in the first resource unit is less than or equal to a pre-configured number.

In step S2320, the first device 100 may select a first transmission resource from the plurality of resources, based on the sensing. For example, among the plurality of resources, the first transmission resource may be selected from candidate resources selected based on a pre-configured ratio.

Additionally, the first device 100 may perform sensing for the plurality of resources, based on a second resource unit including one or more symbols. In this case, the number of symbols included in the second resource unit may be different from the number of symbols included in the first resource unit. For example, among the plurality of resources, the first transmission resource may be selected from a candidate resource selected based on a first ratio related to the first resource unit or a second ratio related to the second resource unit. For example, if a transmission resource related to the number of symbols included in the first resource unit is required in the sidelink transmission, the first transmission resource may be selected from candidate resources selected based on the first ratio related to the first resource unit. For example, if a transmission resource related to the number of symbols included in the second resource unit is required in the sidelink transmission, the first transmission resource may be selected from candidate resources selected based on the second ratio related to the second resource unit.

In step S2330, the first device 100 may perform the sidelink transmission on the first transmission resource.

For example, the first transmission resource may be periodically reserved. In this case, additionally, the first device 100 may transmit information on a period of the first transmission resource and information on the number of symbols included in the first transmission resource to the second device 200.

For example, if the number of sidelink-related symbols included in a first slot in which the first transmission resource is reserved is less than the number of symbols included in the first transmission resource, the sidelink transmission may not be performed on the first slot. In this case, additionally, the first device 100 may reserve a second transmission resource in a second slot including the sidelink-related symbol. Herein, the second slot may be adjacent to the first slot.

For example, the first transmission resource may be selected on a resource not related to a channel or signal for communication between a base station and a UE.

The proposed method may be performed by various devices described in the present specification. First, the processor 102 of the first device 100 may perform sensing for a plurality of resources, based on a first resource unit including one or more symbols. In addition, the processor 102 of the first device 100 may select a first transmission resource from the plurality of resources, based on the sensing. In addition, the processor 102 of the first device 100 may control the transceiver 106 to perform the sidelink transmission on the first transmission resource.

Examples for the aforementioned proposed scheme can be included as one of implementation methods of the present disclosure, and thus can be apparently regarded as a sort of proposed methods. In addition, although the aforementioned proposed schemes can be independently implemented, it is also possible to be implemented by combining (or merging) some proposed schemes. For example, although the proposed method is described in the present disclosure based on the 3GPP system for convenience of explanation, a scope of a system for applying the proposed method may be extended to other systems other than the 3GPP system.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
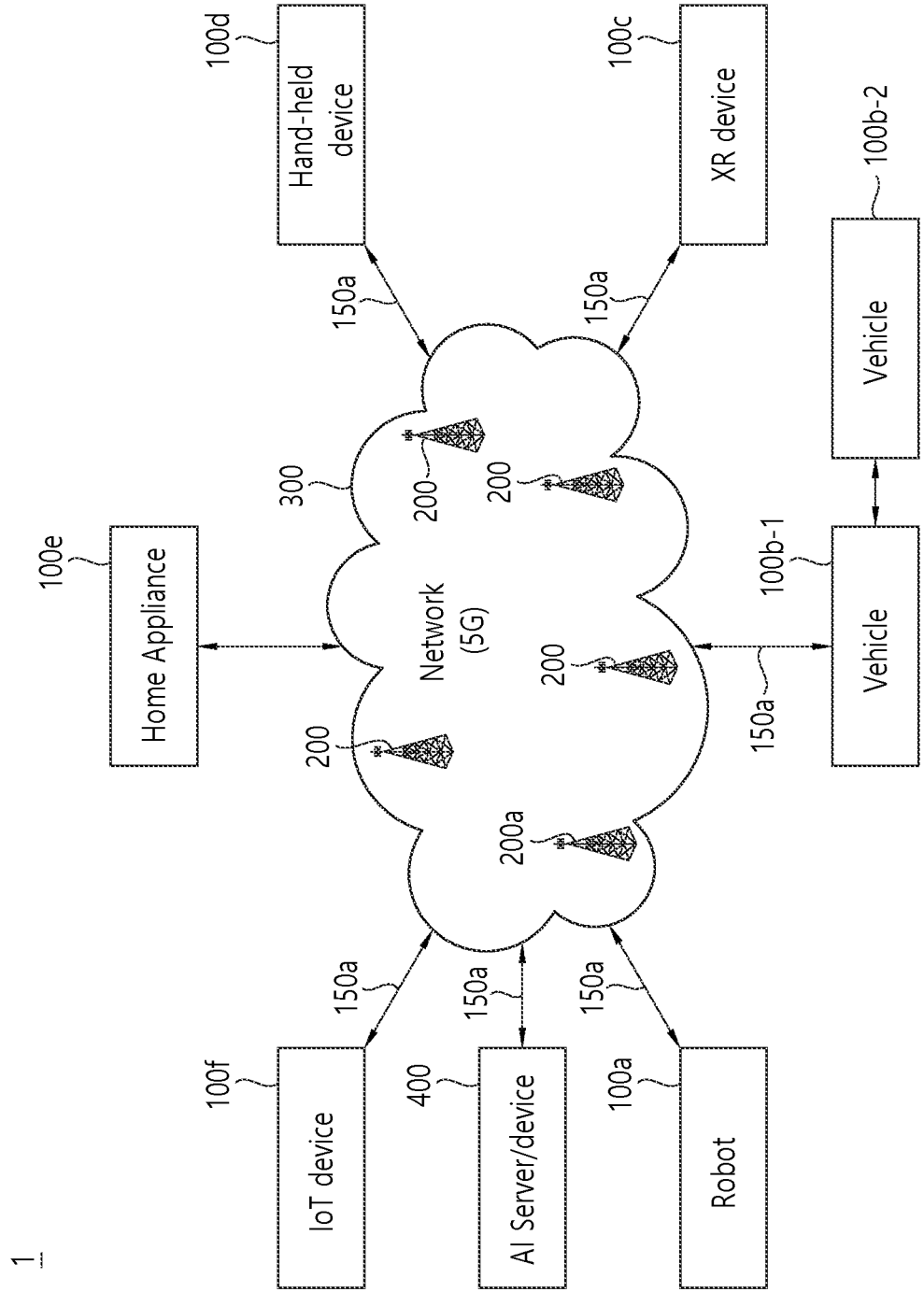
FIG. 24 shows a communication system (1) applied to the present disclosure.

FIG. 24 shows a communication system (1) applied to the present disclosure.

Referring to FIG. 24, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f, and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
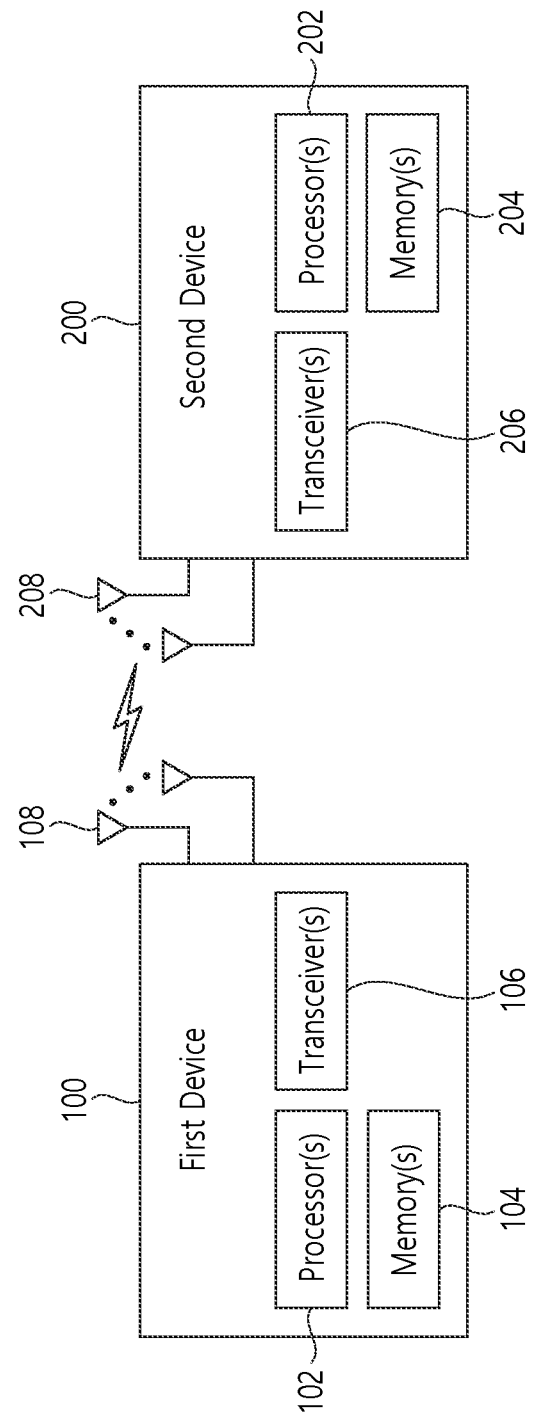
FIG. 25 shows wireless devices applicable to the present disclosure.

FIG. 25 shows wireless devices applicable to the present disclosure.

Referring to FIG. 25, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 24.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 26:
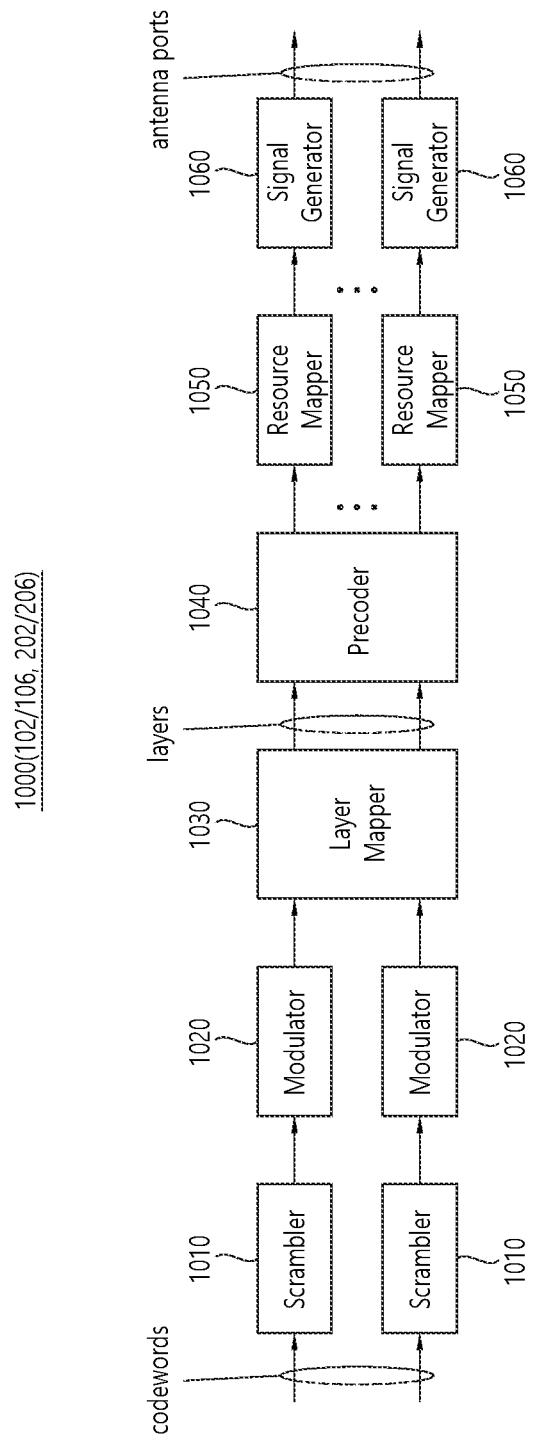
FIG. 26 shows a signal process circuit for a transmission signal.

FIG. 26 shows a signal process circuit for a transmission signal.

Referring to FIG. 26, a signal processing circuit (1000) may include scramblers (1010), modulators (1020), a layer mapper (1030), a precoder (1040), resource mappers (1050), and signal generators (1060). An operation/function of FIG. 26 may be performed, without being limited to, the processors (102, 202) and/or the transceivers (106, 206) of FIG. 25. Hardware elements of FIG. 26 may be implemented by the processors (102, 202) and/or the transceivers (106, 206) of FIG. 25. For example, blocks 1010~1060 may be implemented by the processors (102, 202) of FIG. 25. Alternatively, the blocks 1010 to 1050 may be implemented by the processors (102, 202) of FIG. 25 and the block 1060 may be implemented by the transceivers (106, 206) of FIG. 25.

Codewords may be converted into radio signals via the signal processing circuit (1000) of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 26. For example, the wireless devices (e.g., 100, 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
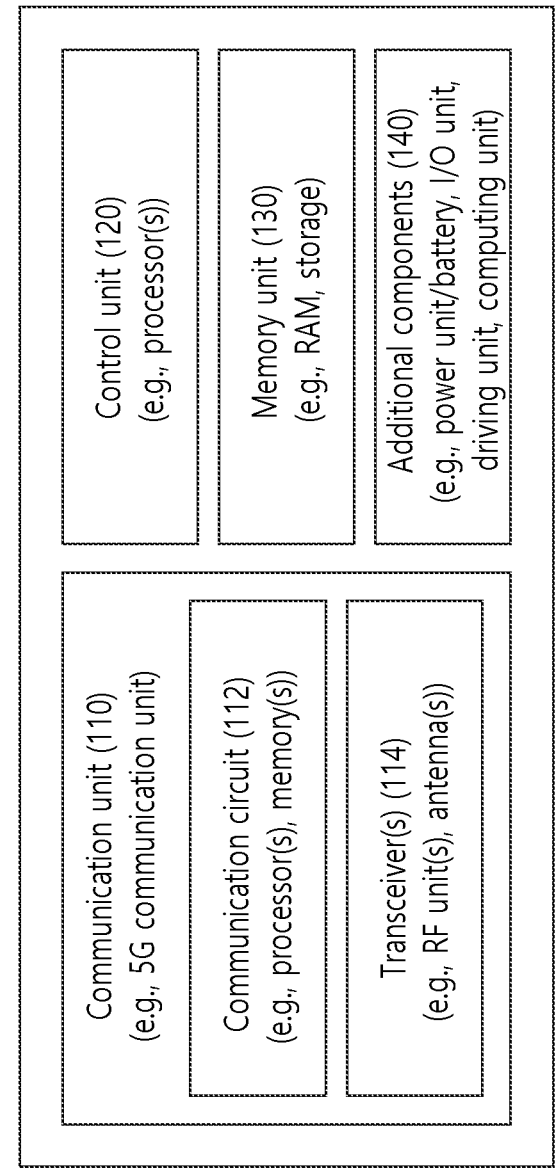
FIG. 27 shows another example of a wireless device applied to the present disclosure.

FIG. 27 shows another example of a wireless device applied to the present disclosure. The wireless device may be implemented in various forms according to a use-case/service (refer to FIG. 24 and FIGS. 26 to 31).

Referring to FIG. 27, wireless devices (100, 200) may correspond to the wireless devices (100, 200) of FIG. 25 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 25. For example, the transceiver(s) (114) may include the one or more transceivers (106, 206) and/or the one or more antennas (108, 208) of FIG. 25. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 24), the vehicles (100b-1, 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
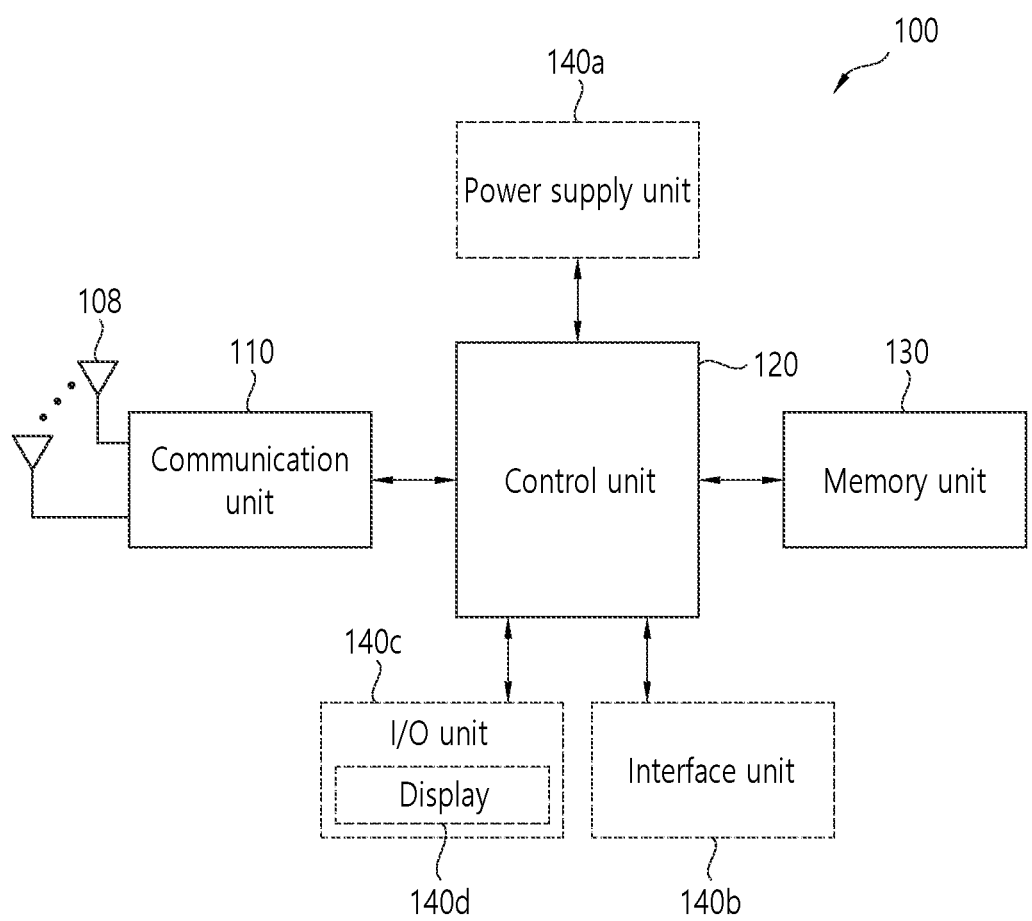
FIG. 28 shows a hand-held device applied to the present disclosure.

FIG. 28 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 27, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may acquire information/signals (e.g., touch, text, voice, images, or video) input by a user and the acquired information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 29:
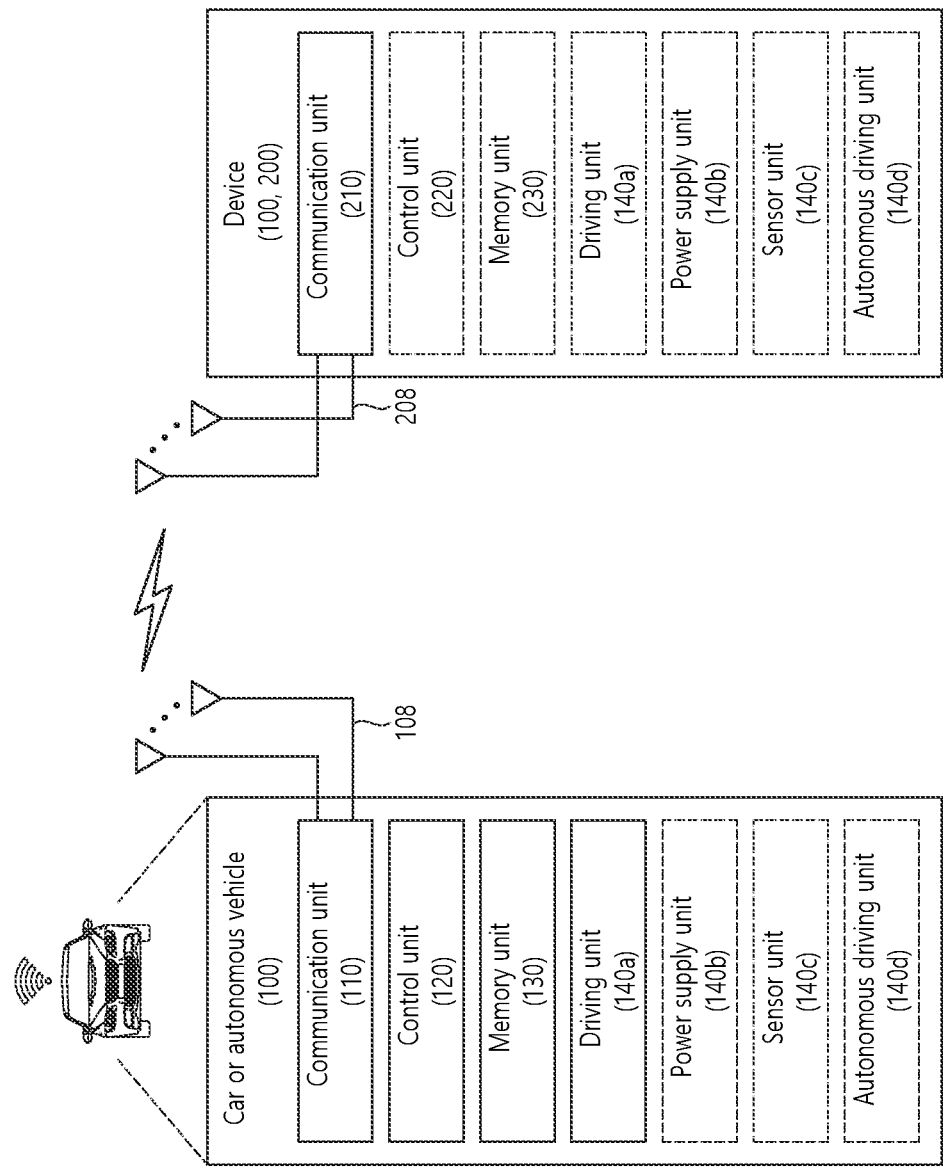
FIG. 29 shows a vehicle or an autonomous driving vehicle applied to the present disclosure.

FIG. 29 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 27, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140a) may cause the vehicle or the autonomous driving vehicle (100) to drive on a road. The driving unit (140a) may include an engine, a motor, a powertrain, a wheel, a brake, a steering device, etc. The power supply unit (140b) may supply power to the vehicle or the autonomous driving vehicle (100) and include a wired/wireless charging circuit, a battery, etc. The sensor unit (140c) may acquire a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous driving vehicle (100) may move along the autonomous driving path according to the driving plan (e.g., speed/direction control). In the middle of autonomous driving, the communication unit (110) may aperiodically/periodically acquire recent traffic information data from the external server and acquire surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 30:
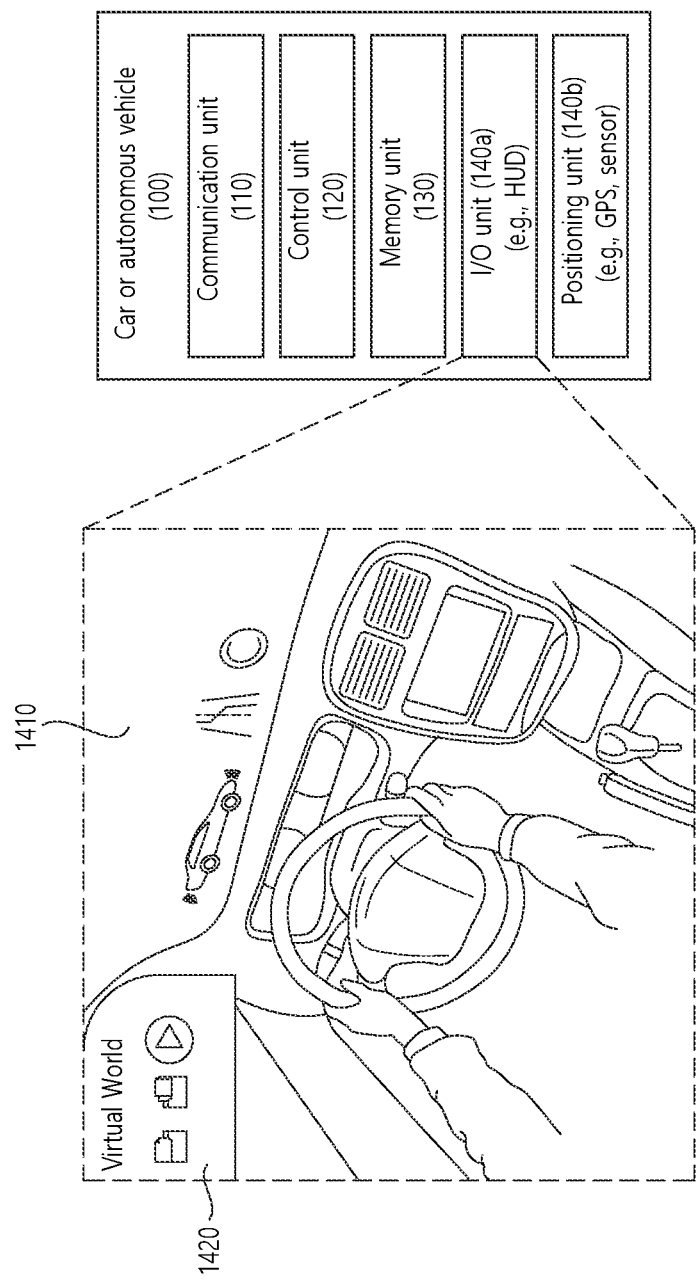
FIG. 30 shows a vehicle applied to the present disclosure.

FIG. 30 shows a vehicle applied to the present disclosure. The vehicle may be implemented as a transport means, an aerial vehicle, a ship, etc.

Referring to FIG. 30, a vehicle (100) may include a communication unit (110), a control unit (120), a memory unit (130), an I/O unit (140a), and a positioning unit (140b). Herein, the blocks 110 to 130/140a-140b correspond to blocks 110 to 130/140 of FIG. 27.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include a HUD. The positioning unit (140b) may acquire information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 31:
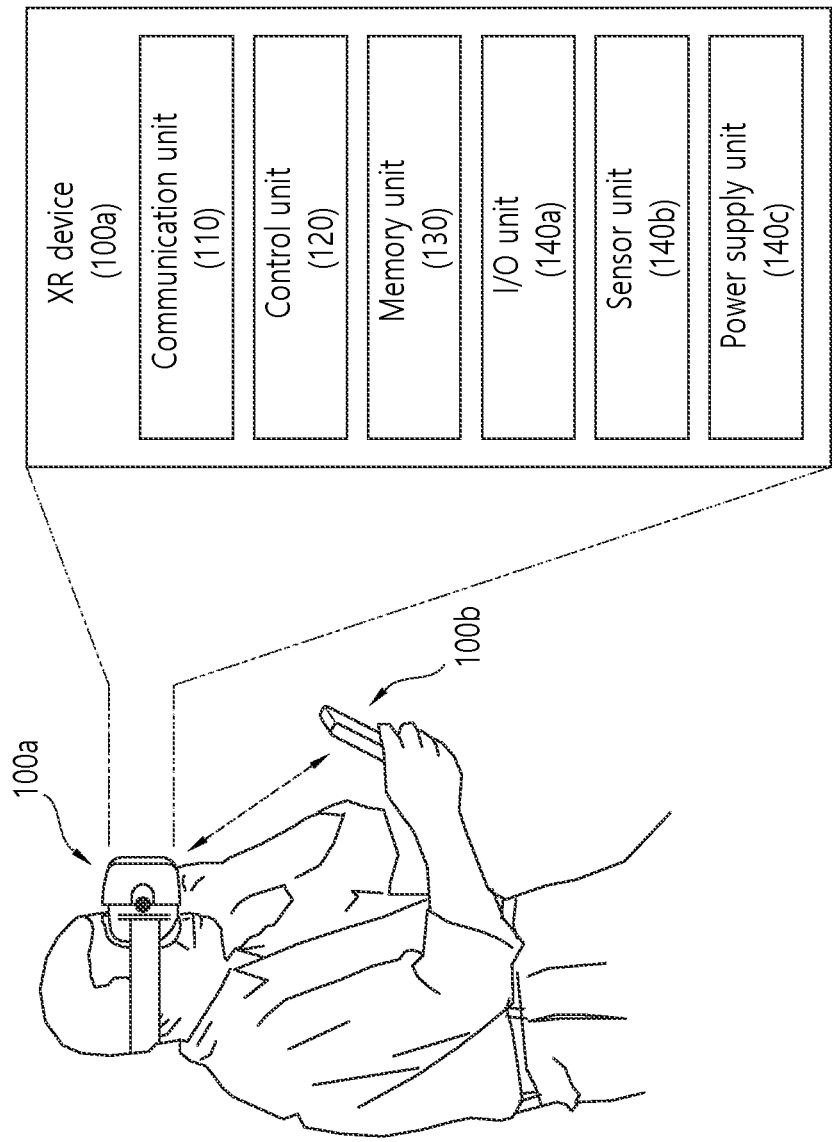
FIG. 31 shows an XR device applied to the present disclosure.

FIG. 31 shows an XR device applied to the present disclosure. The XR device may be implemented by an HMD, a HUD mounted in a vehicle, a television, a smartphone, a computer, a wearable device, a home appliance, a digital signage, a vehicle, a robot, etc.

Referring to FIG. 31, an XR device (100a) may include a communication unit (110), a control unit (120), a memory unit (130), an I/O unit (140a), a sensor unit (140b), and a power supply unit (140c). Herein, the blocks 110 to 130/140a-140c correspond to the blocks 110 to 130/140 of FIG. 27, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 32:
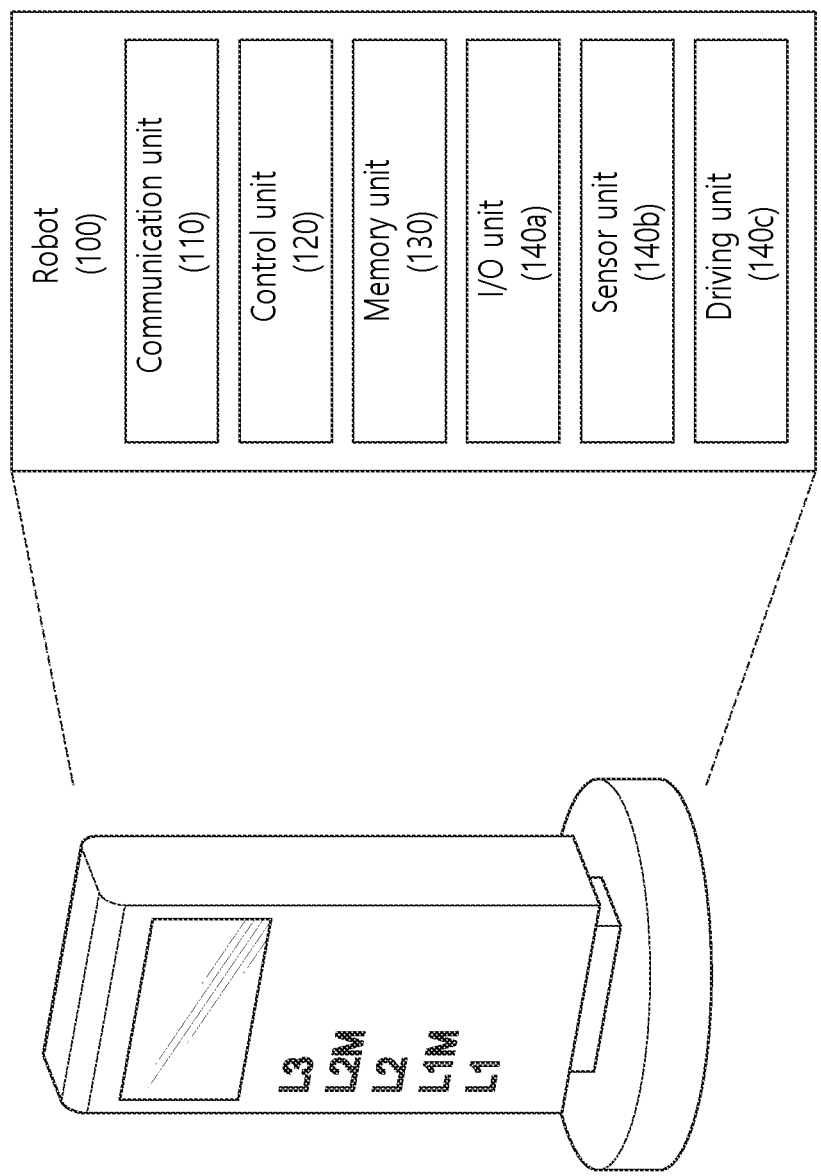
FIG. 32 shows a robot applied to the present disclosure.

FIG. 32 shows a robot applied to the present disclosure. The robot may be categorized into an industrial robot, a medical robot, a household robot, a military robot, etc., according to a used purpose or field.

Referring to FIG. 32, a robot (100) may include a communication unit (110), a control unit (120), a memory unit (130), an I/O unit (140a), a sensor unit (140b), and a driving unit (140c). Herein, the blocks 110 to 130/140a-140c correspond to the blocks 110 to 130/140 of FIG. 27, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 33:
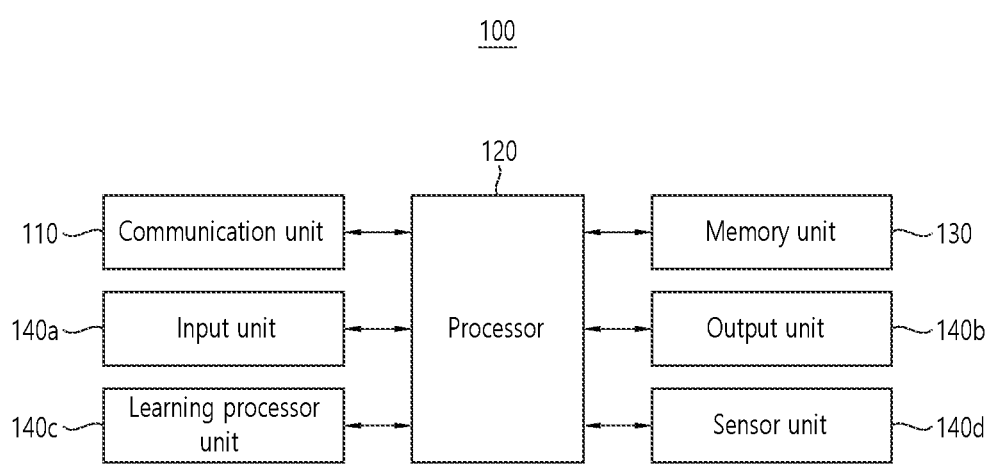
FIG. 33 shows an AI device applied to the present disclosure.

FIG. 33 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 33, an AI device (100) may include a communication unit (110), a control unit (120), a memory unit (130), an I/O unit (140a/140b), a learning processor unit (140c), and a sensor unit (140d). The blocks 110 to 130/140a-140d correspond to blocks 110 to 130/140 of FIG. 27, respectively.

The communication unit (110) may transmit and receive wired/radio signals (e.g., sensor information, user input, learning models, or control signals) to and from external devices such as other AI devices (e.g., 100x, 200, 400 of FIG. 24) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 24). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may acquire various types of data from the exterior of the AI device (100). For example, the input unit (140a) may acquire learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 24). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:
1. A method of performing wireless communication by a first device, the method comprising:
 performing sensing for a plurality of resources, based on a plurality of first resource units in which each of the plurality of first resource units includes one or more symbols, wherein the first device is not allowed to perform the sensing, based on a plurality of second resource units in which a number of one or more symbols of the each of the plurality of the second resource units is different from a number of the one or more symbols of the each of the plurality of the first resource units, and wherein the plurality of resources include a first transmission resource for physical sidelink control channel (PSCCH) transmission and physical sidelink shared channel (PSSCH) transmission in a resource allocation mode for which the first device decides at least one transmission resource in a resource pool;

selecting a first transmission resource from the plurality of resources, based on the sensing; and performing the PSCCH transmission and the PSSCH transmission related to the PSCCH transmission, based on the first transmission resource, wherein based on the number of the one or more symbols of the each of the plurality of the first resource units being less than a number of symbols included in the first transmission resource, the sidelink transmission is skipped on the first transmission resource.

2. The method of claim 1, wherein the sensing is performed for a resource in which the number of sidelink-related symbols is equal to the number of symbols included in each of the plurality of first resource units.

3. The method of claim 1, wherein the sensing is performed for a resource in which a difference between the number of the sidelink-related symbols and the number of symbols included in each of the plurality of first resource units is less than or equal to a pre-configured number.

4. The method of claim 1, wherein the plurality of resources are a set of resources in which the number of sidelink-related symbols is equal to the number of symbols included in each of the plurality of first resource units.

5. The method of claim 1, wherein the plurality of resources are a set of resources in which a difference between the number of sidelink-related symbols and the number of symbols included in each of the plurality of first resource units is less than or equal to a pre-configured number.

6. The method of claim 1, wherein, among the plurality of resources, the first transmission resource is selected from candidate resources selected based on a pre-configured ratio.

7. The method of claim 1, wherein, among the plurality of resources, the first transmission resource is selected from a candidate resource selected based on a first ratio related to each of the plurality of first resource units or a second ratio related to each of the plurality of first resource units.

8. The method of claim 1, wherein, based on that a transmission resource related to the number of symbols included in each of the plurality of first resource units is required in the sidelink transmission, the first transmission resource is selected from candidate resources selected based on a first ratio related to each of the plurality of first resource units, and wherein, based on that a transmission resource related to the number of symbols included in each of the plurality of first resource units is required in the sidelink transmission, the first transmission resource is selected from candidate resources selected based on a second ratio related to each of the plurality of first resource units.

9. The method of claim 1, wherein the first transmission resource is periodically reserved.

10. The method of claim 9, further comprising transmitting information on a period of the first transmission resource and information on the number of symbols included in the first transmission resource, to a second device.

11. The method of claim 1, further comprising reserving a second transmission resource in a second slot including the sidelink-related symbol, wherein the second slot is adjacent to a first slot in which the first transmission resource is reserved.

12. The method of claim 1, wherein the first transmission resource is selected on a resource not related to a channel or signal for communication between a base station and a user equipment (UE).

13. A first device configured to perform wireless communication, the first device comprising:

one or more processors;

one or more transceivers; and one or more memories operably connected to the one or more processors and storing instructions that, based on being executed by the one or more processors, cause the first device to perform operations, wherein the operations comprise:

performing sensing for a plurality of resources, based on a plurality of first resource units in which each of the plurality of first resource units includes one or more symbols wherein the first device is not allowed to perform the sensing, based on a plurality of second resource units in which a number of one or more symbols of the each of the plurality of the second resource units is different from a number of the one or more symbols of the each of the plurality of the first resource units, and wherein the plurality of resources include a first transmission resource for physical sidelink control channel (PSCCH) transmission and physical sidelink shared channel (PSSCH) transmission in a resource allocation mode for which the first device decides at least one transmission resource in a resource pool;

selecting a first transmission resource from the plurality of resources, based on the sensing; and performing the PSCCH transmission and the PSSCH transmission related to the PSCCH transmission, based on the first transmission resource, wherein based on the number of the one or more symbols of the each of the plurality of the first resource units being less than a number of symbols included in the first transmission resource, the sidelink transmission is skipped on the first transmission resource.

* * * * *